(12) United States Patent
Eberle et al.

(10) Patent No.: US 11,470,394 B2
(45) Date of Patent: *Oct. 11, 2022

(54) SCALABLE LIGHT-WEIGHT PROTOCOLS FOR WIRE-SPEED PACKET ORDERING

(71) Applicant: NVIDIA Corp., Santa Clara, CA (US)

(72) Inventors: Hans Eberle, Mountain View, CA (US); Larry Robert Dennison, Mendon, MA (US)

(73) Assignee: NVIDIA CORP., Santa Clara, CA (US)

( * ) Notice: Subject to any disclaimer, the term of this patent is extended or adjusted under 35 U.S.C. 154(b) by 58 days.

This patent is subject to a terminal disclaimer.

(21) Appl. No.: 16/934,895

(22) Filed: Jul. 21, 2020

(65) Prior Publication Data

US 2020/0374594 A1 Nov. 26, 2020

Related U.S. Application Data

(63) Continuation of application No. 16/376,988, filed on Apr. 5, 2019, now Pat. No. 10,820,057.

(60) Provisional application No. 62/757,098, filed on Nov. 7, 2018.

(51) Int. Cl.
| | |
|---|---|
| *H04N 21/472* | (2011.01) |
| *H04N 21/2387* | (2011.01) |
| *H04N 21/6583* | (2011.01) |
| *H04L 45/7453* | (2022.01) |
| *H04N 21/43* | (2011.01) |
| *H04L 47/283* | (2022.01) |
| *H04L 45/00* | (2022.01) |

(Continued)

(52) U.S. Cl.
CPC ....... *H04N 21/47217* (2013.01); *H04L 45/20* (2013.01); *H04L 45/7453* (2013.01); *H04L 47/283* (2013.01); *H04N 21/2387* (2013.01); *H04N 21/23406* (2013.01); *H04N 21/4302* (2013.01); *H04N 21/6583* (2013.01); *H04L 47/624* (2013.01)

(58) Field of Classification Search
CPC ....... H04N 21/47217; H04N 21/23406; H04N 21/2387; H04N 21/4302; H04N 21/6583; H04L 45/02; H04L 45/7453; H04L 47/283; H04L 47/624
See application file for complete search history.

(56) References Cited

U.S. PATENT DOCUMENTS

| | | | |
|---|---|---|---|
| 7,389,462 | B1 | 6/2008 | Wang et al. |
| 9,495,231 | B2 | 11/2016 | Gilda et al. |
| 10,581,645 | B1 | 3/2020 | Song et al. |

(Continued)

FOREIGN PATENT DOCUMENTS

JP 5863076 B2 2/2016

OTHER PUBLICATIONS

H. Eberle and L. Dennison, "Light-Weight Protocols for Wire-Speed Ordering," in High Performance Computing, Networking, Storage and Analysis, 2018. SC 2018. International Conference for. IEEE, 2018, pp. 1-12.

(Continued)

*Primary Examiner* — Sunghyoun Park
(74) *Attorney, Agent, or Firm* — Rowan TELS LLC

(57) ABSTRACT

A communication method between a source device and a target device utilizes speculative connection setup between the source device and the target device, target-device-side packet ordering, and fine-grained ordering to remove packet dependencies.

19 Claims, 18 Drawing Sheets

(51) Int. Cl.
*H04N 21/234* (2011.01)
*H04L 47/62* (2022.01)

(56) References Cited

U.S. PATENT DOCUMENTS

| | | |
|---|---|---|
| 10,820,057 B2 | 10/2020 | Eberle et al. |
| 11,108,704 B2 | 8/2021 | Blumrich et al. |
| 2003/0088694 A1 | 5/2003 | Patek et al. |
| 2004/0215810 A1 | 10/2004 | Tan et al. |
| 2005/0083921 A1 | 4/2005 | McDermott et al. |
| 2008/0084873 A1 | 4/2008 | Pullen et al. |
| 2008/0151841 A1 | 6/2008 | Yi et al. |
| 2009/0168723 A1 | 7/2009 | Meylan |
| 2011/0131654 A1 | 6/2011 | Taneja et al. |
| 2011/0302383 A1 | 12/2011 | Ignatius et al. |
| 2012/0117605 A1* | 5/2012 | Miao .......... H04N 21/2387 725/115 |
| 2013/0028083 A1 | 1/2013 | Yoshida et al. |
| 2013/0343388 A1 | 12/2013 | Stroud et al. |
| 2014/0321471 A1 | 10/2014 | Lau et al. |
| 2014/0351239 A1 | 11/2014 | Davis et al. |
| 2016/0188398 A1* | 6/2016 | Gilda .......... G06F 3/0629 714/55 |
| 2016/0345219 A1 | 11/2016 | Brisebois et al. |
| 2017/0026289 A1* | 1/2017 | Vinsel .......... H04L 49/354 |
| 2018/0307485 A1 | 10/2018 | Appu et al. |
| 2018/0308272 A1 | 10/2018 | Appu et al. |
| 2019/0304055 A1 | 10/2019 | Vembu et al. |
| 2020/0053002 A1 | 2/2020 | Heidelberger et al. |
| 2020/0145725 A1 | 5/2020 | Eberle et al. |
| 2020/0151289 A1 | 5/2020 | Sikka et al. |
| 2020/0177521 A1 | 6/2020 | Blumrich et al. |
| 2020/0210276 A1 | 7/2020 | Sullivan et al. |
| 2020/0344143 A1 | 10/2020 | Faseela et al. |
| 2020/0374593 A1 | 11/2020 | Eberle et al. |
| 2020/0374594 A1 | 11/2020 | Eberle et al. |
| 2020/0412835 A1 | 12/2020 | Xu et al. |
| 2021/0344616 A1 | 11/2021 | Blumrich et al. |

OTHER PUBLICATIONS

U.S. Appl. No. 17/377,943, filed Jul. 16, 2021, Matthias Augustin Blumrich.
NPL_German PTO Office Action_1020191/298,997_08092022.

\* cited by examiner

SCALABLE LIGHT-WEIGHT PROTOCOLS FOR WIRE-SPEED PACKET ORDERING

This application claims priority and benefit as a continuation of U.S. application Ser. No. 16/376,988, titled "Scalable Light-Weight Protocols for Wire-Speed Packet Ordering", filed on Apr. 5, 2019, the contents of which are incorporated herein by reference in their entirety. U.S. application Ser. No. 16/376,988 claims priority and benefit of U.S. Application Ser. No. 62/757,098, titled "Scalable Light-Weight Protocols for Wire-Speed Packet Ordering", filed on Nov. 7, 2018, the contents of which are incorporated herein by reference in their entirety.

GOVERNMENT LICENSE RIGHTS

This invention was made with US Government support under Agreement H98230-16-3-0001 awarded by the Department of Defense. The US Government has certain rights in this invention.

BACKGROUND

Many considerations influence the design of an ordering mechanism for packets, including the frequency of out-of-order packets, throughput and latency goals for ordered traffic, and implementation costs. Approaches include transmitter-side ordering and deterministic routing. Transmitter-side ordering is typically done by serializing packet transfers such that the transmitter waits for a request packet to be acknowledged before the next request packet is injected into the network. This approach limits the transfer rate to at most one packet every network round-trip time (RTT). Another technique often employed restricts ordered streams to a single deterministic path between source and target. Though different streams may still be routed over multiple paths, deterministic routing may have a significant performance impact. In particular, networks often lack the ability to provide fine-grained ordering and, without it, are unable to exploit the available path diversity.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
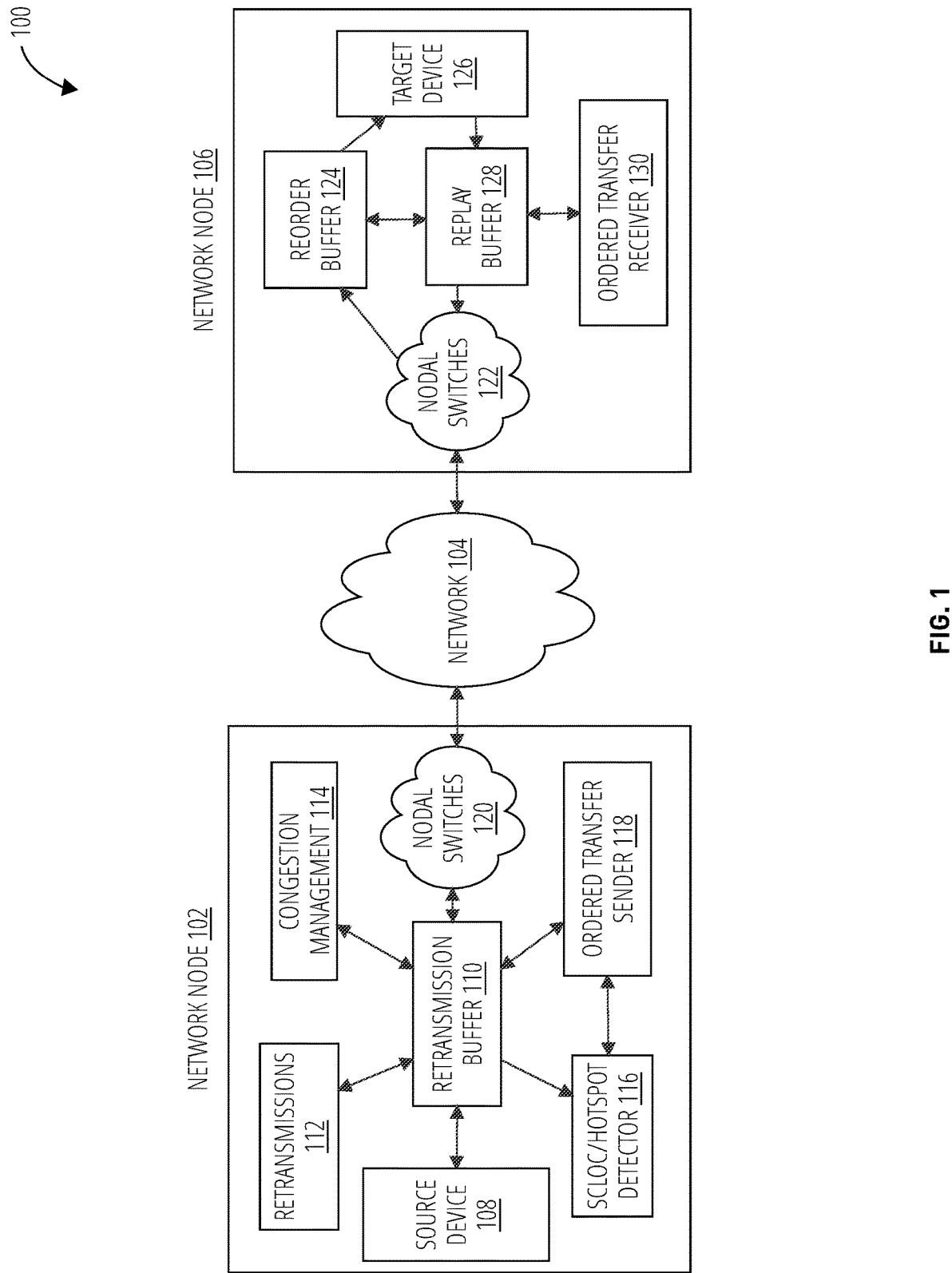
FIG. 1 illustrates a transceiver system 100 in accordance with one embodiment.

Packet transmission protocols are disclosed including ordered transfers and synchronized transfers. Ordered transfers impose strict sequential ordering on packet delivery. Synchronized transfers provide relaxed ordering for multi-packet transfers that are terminated with a synchronization operation. The protocols may not restrict routing through a network, including a multipath routing network. The protocols achieve link-rate performance through the following techniques: (1) speculative connection setup avoids round-trip delays found in protocols with little knowledge about endpoint resources; (2) target-side ordering avoids round-trip delays found in source-side ordering mechanisms; (3) fine-grained ordering removes dependencies, thus avoiding cumulative ordering dependencies caused by coarse-grained ordering; and (4) ordering relaxations and optimizations for producer/consumer communication patterns.

With a speculative connection setup, the protocol may send a request (REQ) packet to a target device to switch to fast mode. A protocol at the target device may determine whether resources are available, such as in a replay buffer associated with the target device, to support fast mode. The target device may reply with a negative acknowledgment (NACK) packet if the resources are not available for fast mode.

The protocols may assume that the data network implements a load/store model where remote memory may be accessed like local memory, and network packets convey memory operations. Ordering requirements apply similarly to memory accesses locally and remotely. The protocols may further assume that no ordering has to be applied to response packets returned to the source and that the source has mechanisms in place to reorder responses if needed. The protocols further assume that no reliable transport service is provided. Thus, the ordering protocol may be capable of recovering from packet loss. The protocols further assume that packets in the network have a maximum lifetime. If a packet is not ejected to an endpoint within its lifetime, the protocol determines that the packet is lost and may not emerge from the network. Packet lifetime is enforced by a maximum hop count and a maximum switch and link-traversal time. A non-byzantine failure model is assumed in which packets in the network may be lost but never duplicated.

In one embodiment, a connection is opened when the first packet of an ordered transfer arrives at the target device. A packet that arrives in order is forwarded to the target device.

A packet that arrives out of order is stored in the reorder buffer, and the connection is closed when there are no more outstanding packets.

In another embodiment, the connection is opened when a first packet of a synchronized, multi-packet transfer arrives at the target device and packets of the multi-packet transfer are forwarded to the target device in the order they arrive, A count is received of a number of packets in the multi-packet transfer in a synchronization packet and the synchronization packet is stored in a reorder buffer until all the packets of the multi-packet transfer have been delivered. The synchronization packet is forwarded to the target device after all the packets of the multi-packet transfer have been delivered and the connection is closed when there are no more outstanding packets of the multi-packet transfer.

In either of these embodiments, packets may be transported over an unordered and unreliable network connecting the source device and the target device. One or more of the packets may comprise a command, data, or both for a memory operation, such as reading data, writing data, moving data, erasing data, or performing memory allocation.

The sequence diagrams are labeled with indices for the following packet types:

REQ: Request packet.
ACK: Acknowledgment packet. Acknowledges receipt of REQ.
NACK: Negative acknowledgment packet. Indicates that REQ was rejected and instructs the source to retransmit the corresponding REQ.
FIN: Finalize packet. Instructs the target to close the connection.
FIN-ACK: Finalize acknowledgment packet. Signals to the source that the target has closed the connection.

The packets may have the following packet flags:

SYN: Synchronize sequence number counter. Indicates to the target that the value of the SEQ field contained in the packet is to be used as the starting sequence number.
EOD: Exactly-once delivery.
CON: Connection has been established.

The packets may have the following other parameters:

CID: Connection identifier.
SEQ: Sequence number.
CNT: Count of all request packets in a synchronized transfer.

The following description may use certain acronyms and abbreviations as follows:

"DPC" refers to a "Data Processing Clusters";
"GPC" refers to a "general processing cluster";
"I/O" refers to a "input/output";
"L1 cache" refers to "level one cache";
"L2 cache" refers to "level two cache";
"LSU" refers to a "load/store unit";
"MMU" refers to a "memory management unit";
"MPC" refers to an "M-pipe controller";
"PPU" refers to a "parallel processing unit";
"PROP" refers to a "pre-raster operations unit";
"ROP" refers to a "Raster Operations";
"SFU" refers to a "special function unit";
"SM" refers to a "streaming multiprocessor";
"Viewport SCC" refers to "viewport scale, cull, and clip";
"WDX" refers to a "work distribution crossbar"; and
"XBar" refers to a "crossbar".

Referring to FIG. 1, a transceiver system 100 comprises a network node 102, a network 104, and a network node 106. The network node 102 further comprises a source device 108, a retransmission buffer 110, retransmission logic 112, congestion management logic 114, a sequential consistency per memory location and hotspot detector 116, an ordered transfer sender 118, and nodal switches 120. The network node 106 further comprises nodal switches 122, a reorder buffer 124, a target device 126, a replay buffer 128, and an ordered transfer receiver 130.

The source device 108 sends request packets to the target device 126 via the network 104. The target device 126 sends acknowledgement or negative acknowledgement packets to the source device 108 via the network 104. The source device 108 and the target device 126 may also communicate finalize (FIN) and finalize acknowledgement (FIN-ACK) packets. The network 104 may be a multi-path network. An exemplary network is a Dragonfly network. The network 104 has characteristics, including a round-trip time, a shortest path, and a longest path. The difference between the longest path and the shortest path determines the network skew of traffic.

The source device 108 sends request packets to the retransmission buffer 110. The source device 108 may determine the packet type, flags, and parameters of the request packet. The source device 108 also receives response packets, such as acknowledgement packets, negative acknowledgement packets, etc., from the retransmission buffer 110.

The retransmission buffer 110 receives the request packets from the source device 108 and response packets from the nodal switches 120. The retransmission buffer 110 sends the request packets to the nodal switches 120 and the response packets to the source device 108. The retransmission buffer 110 may be sized based on the characteristics of the network 104. For example, the retransmission buffer 110 may be sized to store a round trip time worth of network traffic based on the network characteristics.

The retransmission logic 112 determines whether to operate the retransmission buffer 110 to retransmit a request packet, such as in the event of an erroneous or lost packet. A lost packet may be determined based on the round trip time of the network 104. In addition to round trip time, the network skew may be utilized to size network buffers. The retransmission buffer 110 assigns a packet lifetime to packets and may implement a non-byzantine packet failure mode. The retransmission buffer 110 may enforce the packet lifetime with a maximum hop count and a maximum switch and link-traversal time.

The congestion management logic 114 utilizes the retransmission buffer 110 to reschedule packet transmission when there is congestion on the links in the network 104 being utilized. The congestion management logic 114 may alter the operation of the retransmission buffer 110 to utilize different links if the current links are congested.

The sequential consistency per memory location and hotspot detector 116 detects dependencies of the request packets, as well as determining whether the source device 108 has a backlog of request packets to be sent to the target device 126 where the backlog satisfies (e.g., meets, exceeds, meets or exceeds . . . ) a configured threshold level. In response to such a condition, the sequential consistency per memory location and hotspot detector 116 may operate the retransmission buffer 110 to send a request packet for the target device 126 to switch to fast mode.

The ordered transfer sender 118 receives the request packets from the retransmission buffer 110 and orders them based on the dependencies determined by the sequential consistency per memory location and hotspot detector 116 (i.e., source-side ordering). Such source-side ordering occurs when the transceiver system 100 is operated in slow mode. The sequential consistency per memory location and hotspot detector 116 determines slow mode when the source device 108 has a backlog of request packets to be sent to the target device 126 that does not exceed a threshold. Ordered sequences of packets injected by the source device 108 at a low rate may be transmitted in slow mode to avoid the allocation of connection resources utilized by fast mode. The ordered transfer sender 118 may also receive response (e.g., acknowledgement) packets from the retransmission buffer 110 to be returned to the source device 108.

The nodal switches 120 connect, within a node, a group of devices, which includes the source device 108. The nodal switches 122 connect, within a node, another group of devices, which includes the target device 126. The nodal switches 120 and the nodal switches 122 may operate as a local switch for the source device 108 and the target device 126, respectively. Each nodal switch may have an associated bandwidth.

The reorder buffer 124 receives request packets from the nodal switches 122. Request packets received in slow mode or packets that are in order are sent to the target device 126 to determine the response packet. The request packet may include a request to enter fast mode. The reorder buffer 124 then determines whether enough resources are present to support the fast mode request. If so, the response packets are generated by the target device 126 without an explicit handshake to establish fast mode, as the ordered transfer sender 118 assumes that the ordered transfer receiver 130 accepts the alteration to fast mode operation. If available resources are inadequate and the request packet needs to be stored in the reorder buffer, ordered transfer receiver 130 may send a negative acknowledgement (NACK) in response to the request to enter fast mode. Such a response maintains slow mode. Thus, fast mode may be quickly set up.

While in fast mode, the reorder buffer 124 re-orders the request packets based on the dependency of the request packets (target-side re-ordering). The request packets are sent to the target device 126 based on the re-ordering. The reorder buffer 124 may return the transceiver system 100 to slow mode when the connection resources (e.g., the capacity of the reorder buffer 124) are exhausted or below a threshold value. The transceiver system 100 may also be returned to slow mode when there are no more outstanding requests. The initial request packet may indicate a number of requests to be accounted for by the target device 126. The ordered transfer receiver 130 determines the outstanding requests utilizing the indicated number of requests and the number of accounted requests. The ordered transfer receiver 130 may utilize accounting logic. The connections may be torn down by an explicit handshake, such as a finalize packet/finalize acknowledgment packet exchange. By only having active connections for packets that have been sent, the resource allocation depends on the bandwidth-delay product of the network only and is independent of the number of endpoints, which enables a scalable design. The size of the reorder buffer 124 may be based on the associated node bandwidth multiplied by the network skew of traffic. Thus, the buffer capacity is based neither on the number of network nodes nor the number of connections. Such capacity requirements enable resource-constrained implementations, such as a network interface controller (NIC) implementation for coprocessors and accelerators such as graphics processing units.

The ordered transfer receiver 130 may also detect duplicate request packets. Duplicate request packets may lead to faulty program behavior if those packets deliver non-idempotent operations, such as atomic operations or synchronization operations. To determine that a request packet is a duplicate request packet, the ordered transfer receiver 130 may include a state that registers the original request packet. When a duplicate request is detected, the duplicate request is not forwarded to the target device 126 and the ordered transfer receiver 130 controls the replay buffer 128 to replay the response packet that was generated in response to the original request packet.

The target device 126 receives the request packet from the reorder buffer 124. The target device 126 generates a response packet (e.g., an acknowledgement packet) and sends the response packet to the replay buffer 128.

The replay buffer 128 receives the response packet from the target device 126. The replay buffer 128 sends the response packet to be sent to the source device 108 via the network 104. The replay buffer 128 may also store the response packet until the connection is terminated or a control from the ordered transfer sender 118 is received. The replay buffer 128 may also receive a control from the reorder buffer 124 to re-transmit a response packet, such as in the event of a duplicate packet. The replay buffer 128 may be sized based on the characteristics of the network 104. For example, the replay buffer 128 may be sized to store a round trip time worth of network traffic based on the network characteristics.

In one embodiment, the retransmission buffer 110, the retransmission logic 112, the congestion management logic 114, the sequential consistency per memory location and hotspot detector 116, and the ordered transfer sender 118 may be implemented in a NIC or a switch. The reorder buffer 124, the replay buffer 128, and the ordered transfer receiver 130 may also be implemented in a NIC or a switch.

Figure 2:
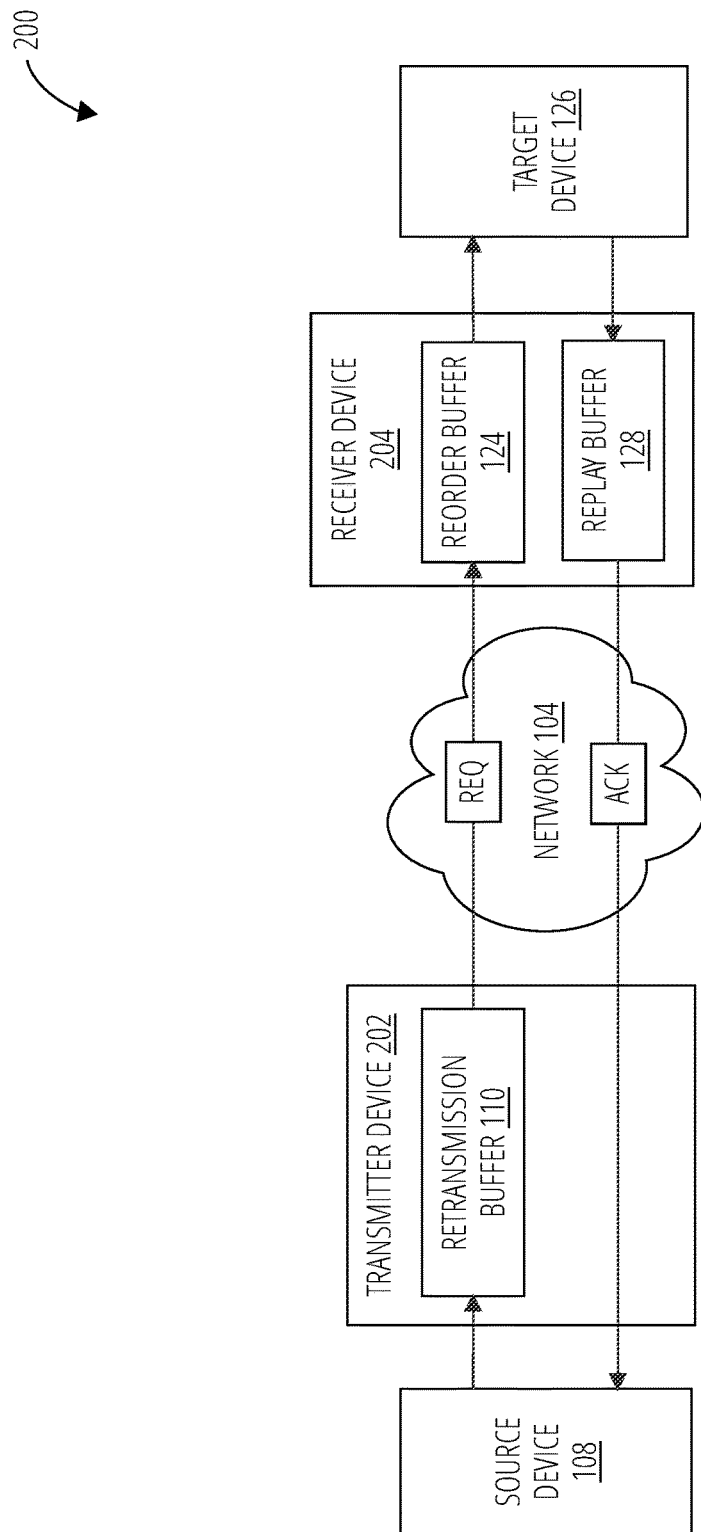
FIG. 2 illustrates a transceiver system 200 in accordance with one embodiment.

Referring to FIG. 2, a transceiver system 200 comprises a source device 108, a transmitter device 202, a network 104, a receiver device 204, and a target device 126. The transmitter device 202 further comprises a retransmission buffer 110. The receiver device 204 further comprises a reorder buffer 124 and a replay buffer 128.

The source device 108 sends request (REQ) packets to the target device 126 via the transmitter device 202, the network 104, and the receiver device 204. The request (REQ) packets may be part of a multi-packet transfer. The REQ packets may include memory operations, a synchronization operation, etc. The REQ packets that are part of a multi-packet transfer may have dependencies on other REQ packets in the multi-packet transfer. These dependencies result in ordering domains. The ordering domains comprise one or more packets that are to be received by the receiver device 204 in a specific sequence. The source device 108 receives acknowledgement (ACK) packets from the target device 126 via the transmitter device 202, the network 104, and the receiver device 204.

The transmitter device 202 may set up light-weight connections with the receiver device 204. The light-weight connections may enforce a packet lifetime limited to a time during which requests between the transmitter device 202 and the receiver device 204 remain active. The transmitter device 202 is configured to employ an explicit handshake to close a connection once response/acknowledgments are received for the requests to deallocate resources at the transmitter device 202 and at the receiver device 204. The transmitter device 202 may utilize an unreliable transport layer protocol to transmit the REQ packets to the receiver device 204 via the network 104. Network packets may be utilized to communicate memory operations to the receiver device 204. The transmitter device 202 or the retransmission buffer 110 may assign a packet lifetime to packets and implement a non-byzantine packet failure mode. The packet lifetime may be enforced by utilizing a maximum hop count and a maximum switch and link-traversal time. The retransmission buffer 110 may resend a packet in response to the packet lifetime being exceeded.

The transmitter device 202 may impose strict ordering on a multi-packet transfer from the transmitter device 202 to the receiver device 204. Strict ordering may be utilized for operations that access the same memory location (e.g., in the target device 126). The transmitter device 202 may utilize a slow mode comprising transmitter-side ordering and/or a fast mode comprising receiver-side ordering. The transmitter-side ordering may be performed by the retransmission buffer 110 or another component of the transmitter device 202. The ordering domains may be isolated and individually mapped to separate ordered streams. The light-weight connections utilized for the fast mode, which utilizes receiver-side ordering, may be speculative connections. That is, the transmitter device 202 may not have information regarding the resources that may be allocated by the receiver device 204 and/or the reorder buffer 124 to operate in the fast mode. A REQ packet may be sent to the receiver device 204 to determine whether to operate in the fast mode.

The acknowledgement (ACK) packets received from the receiver device 204 may be un-ordered. The source device 108 may re-order the un-ordered responses from the receiver device 204.

The network 104 may be a multi-path network. An exemplary network is a Dragonfly network. The network 104 has characteristics, including a round-trip time, a shortest path, and a longest path. The difference between the longest path and the shortest path determines the network skew of traffic.

The receiver device 204 receives the REQ packets from the transmitter device 202 via the network 104. REQ packets received during operation in the slow mode are ordered by transmitter-side ordering and may be sent to the target device 126. REQ packets received while operating in the fast mode may be isolated into ordering domains. The ordering domains are then individually mapped to separate ordered streams. The ordered streams may then be sent to the target device 126. The receiver device 204 may comprise one or more reorder buffers 124 to reorder the REQ packets. The reorder buffer 124 may be sized for no more than one network skew of data traffic. The receiver device 204 or the reorder buffer 124 may include accounting logic to delay a synchronization operation until all associated data operations have become visible. Further logic executes the synchronization operation after completion of the multi-packet transfer.

The receiver device 204 may utilize an unreliable transport layer protocol to transmit the ACK packets to the transmitter device 202 via the network 104. The receiver device 204 includes one or more replay buffers 128 to store the ACK packets. The ACK packets may be stored in the replay buffer 128 until resources are de-allocated by the explicit handshake or a REQ packet is received that indicates that the ACK packet has been received. The receiver device 204 or the reorder buffer 124 may include logic to identify duplicate REQ packets. Once a REQ packet is determined to be a duplicate packet, the replay buffer 128 is utilized to resend the corresponding ACK packet. The duplicate REQ packet may not be sent to the target device 126.

The target device 126 sends acknowledgement (ACK) packets to the source device 108, via the receiver device 204, the network 104, and the transmitter device 202, in response to the REQ packets. The replay buffer 128 may store the ACK packets until resources are deallocated by the explicit handshake or a REQ packet is received that indicates that the ACK packet has been received.

Figure 3:
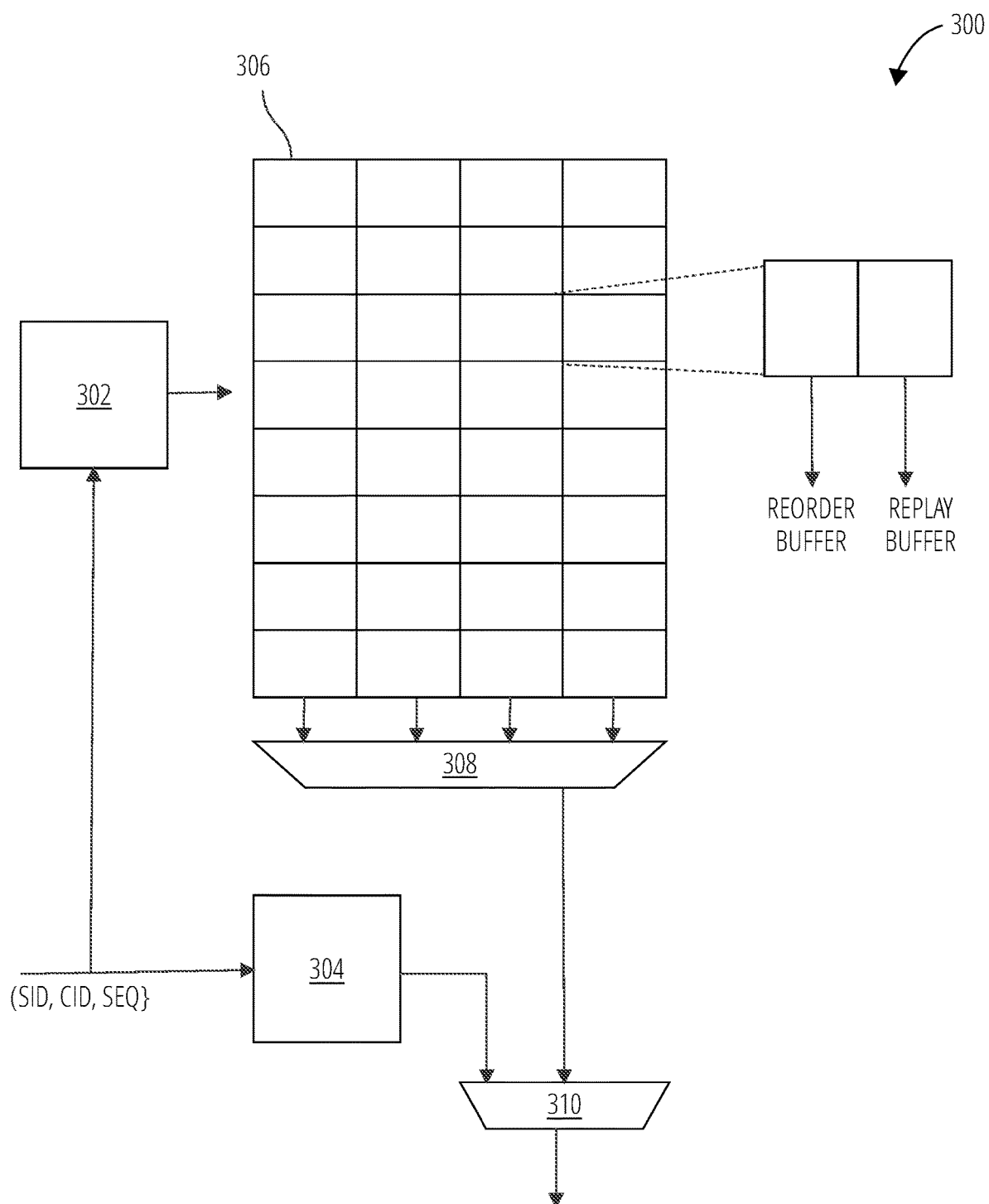
FIG. 3 illustrates a buffer logic 300 in accordance with one embodiment.

FIG. 3 depicts buffer logic 300 in one embodiment. The buffer logic 300 comprises hashing logic 302, a spillover buffer 304, a hash table 306, a column selector 308, and a selector 310.

The reorder and replay buffers have to operate at the full link rate. In particular, out-of-order requests (REQs) may be written into the reorder buffer and acknowledgements (ACKs) may be written into the replay buffer at the full line rate to avoid the loss of link capacity. A buffer design may guarantee constant access times. Conventional data structures used to access elements in the buffers such as linked lists may not be an option due to variable access times.

A hash table 306 is utilized with a spillover buffer 304 coupled in parallel. The hash table 306 and the fully associative spillover buffer 304 are both indexed by a key given by {SID, CID, SEQ}, where SID is the source device identifier, CID is the connection identifier, and SEQ is the sequence number. This key serves as a unique identifier of a packet. An entry in the hash table 306 as well as in the spillover buffer 304 each comprise two pointers, one pointing to an entry in the reorder buffer and, if exactly-once-delivery (EOD) is specified, another one pointing to an entry in the replay buffer. The hashing logic 302 converts the key into a bucket (set of memory locations) in the hash table 306 and the column selector 308 selects the output of that location to the selector 310, which further selects either the hash table 306 value or a value from the spillover buffer 304.

Two techniques may be utilized to minimize the impact of hash collisions. First, the buckets in the hash table 306 are N-way set-associative, providing N locations for packets with the same hash values. Second, by adding the fully associative spillover buffer 304, additional pointer locations are provided that can be utilized when a hash bucket is fully occupied. An alternative design may use separate hash tables to access the reorder and replay buffers. That is, rather than using a shared hash table and storing both the pointer to the reorder buffer and the pointer to the replay buffer in the same entry, two separate tables are used, one holding pointers to the reorder buffer and another one holding pointers to the replay buffer.

Figure 4:
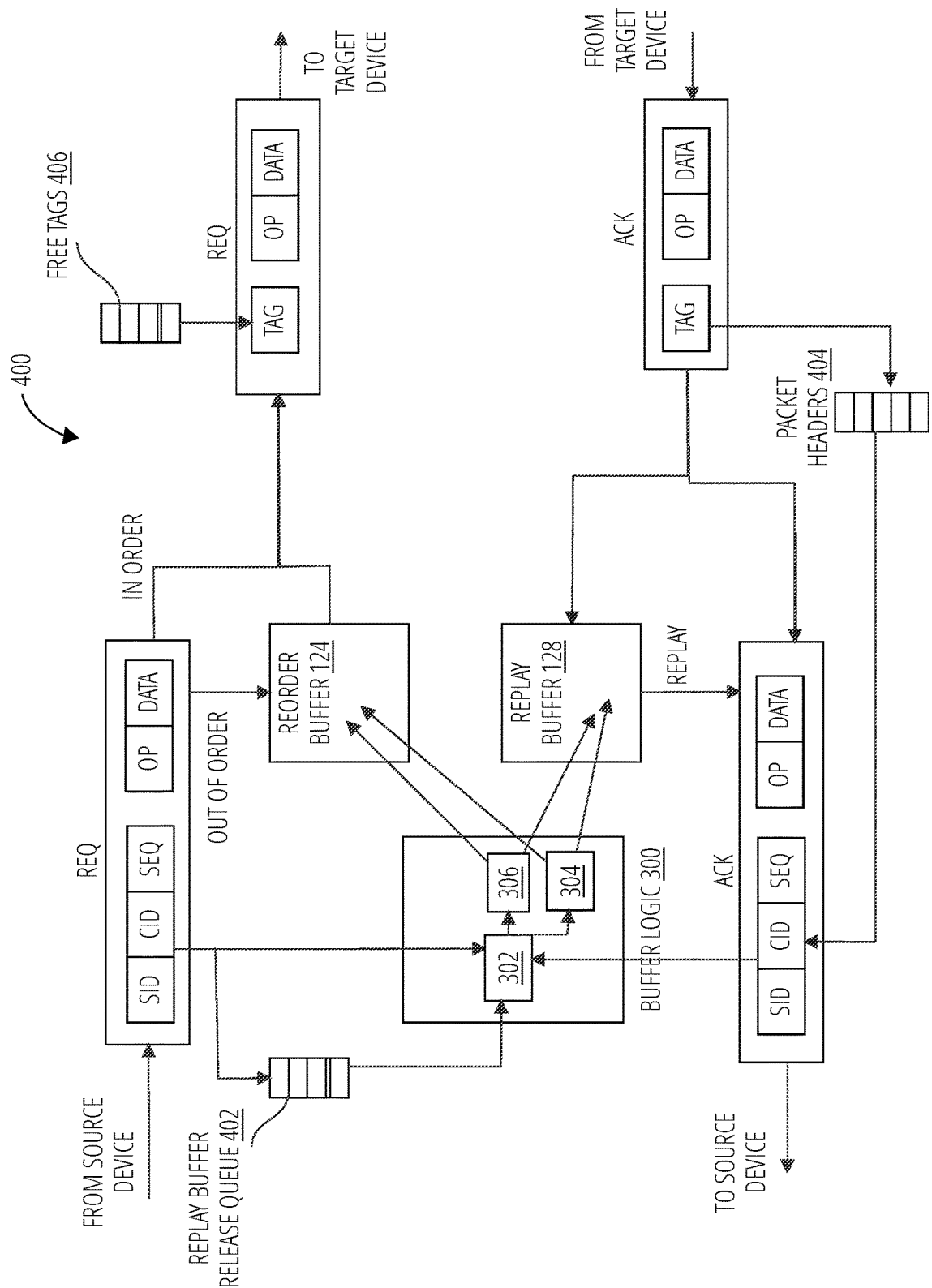
FIG. 4 illustrates a transceiver arrangement 400 in accordance with one embodiment.

How the reorder and replay buffers are accessed with the help of the hash table 306, in one embodiment, is depicted in the transceiver arrangement 400 of FIG. 4. When an out-of-order request (REQ) packet arrives, an entry in the reorder buffer 124 is allocated, and its pointer is stored in the hash table 306 or spillover buffer 304. The REQ includes the SID, the CID, the SEQ (the packet header, see FIG. 4), and in this example, an operation code (OP) and data (DATA). The ACK may likewise include these packet header fields, as well as OP and DATA. When an in-order packet arrives, the hash table 306 and spillover buffer 304 are accessed to determine whether the arriving packet has filled a sequence gap and packets in the reorder buffer 124 have become in-order and can be forwarded to the target memory. To find the next in-order packet, the hash table 306 and spillover buffer 304 are accessed at the location corresponding to the hash of {SID, CID, SEQ+1}. When there is no entry available in the reorder buffer 124, hash table 306, or spillover buffer 304, the arriving packet is 'dropped', that is, a NACK is returned to the sender. When a REQ packet specifies EOD, the corresponding ACK has to be stored in the replay buffer 128 until it is guaranteed that the receiver no longer receives a duplicate REQ that requires regeneration of the ACK. An entry in the hash table 306 or spillover buffer 304 holds both a pointer to the reorder buffer 124 and, if EOD is specified, a pointer to the replay buffer 128.

While the reorder buffer pointer is added to the hash table when an out-of-order REQ is received, the replay buffer pointer is added when the REQ is forwarded to the target device 126. More specifically, a replay buffer entry is allocated and the corresponding pointer is added to the hash table 306 when the REQ is forwarded to the target device 126 (rather than when the ACK is returned). This guarantees that there is an entry available to hold the ACK once it is returned from the target device 126.

Packet headers 404 are stored (e.g., in a table) and replaced with a tag (e.g., from a table of free tags 406) before REQs are forwarded to the target device 126. This saves the target device 126 from handling and storing packet headers. The target device 126 forwards the tag it receives in a REQ to the corresponding ACK so that the receiver can retrieve the packet header before it injects the ACK into the network 104. The replay buffer pointer is added to an existing hash table entry if the REQ was received out of order, or to a newly allocated entry (allocated at the time the REQ is forwarded to the target device 126) if the REQ was received in order. If no entry is available in the hash table 306 or the replay buffer 128 is full, the REQ is dropped and NACKed.

Entries in the reorder buffer 124 and replay buffer 128 are freed as follows. A reorder buffer entry can be released as soon as the corresponding REQ is forwarded to the target device 126. A replay buffer entry can be released once there is no longer a chance that the ACK has to be replayed. A hash table entry can be freed as follows. If a packet does not require EOD, the entry can be freed when the REQ is removed from the reorder buffer 124 and forwarded to the target device 126. If a packet requires EOD, the entry can be freed once the ACK is removed from the replay buffer 128. Because the receipt of a single FIN or REQ packet can trigger the release of several ACK packets requiring several accesses to the hash table 306 and free list, such release requests are stored in a replay buffer release queue 402 to allow for processing them "in the background", whenever cycles to access the hash table 306 and free lists are available.

Figure 5:
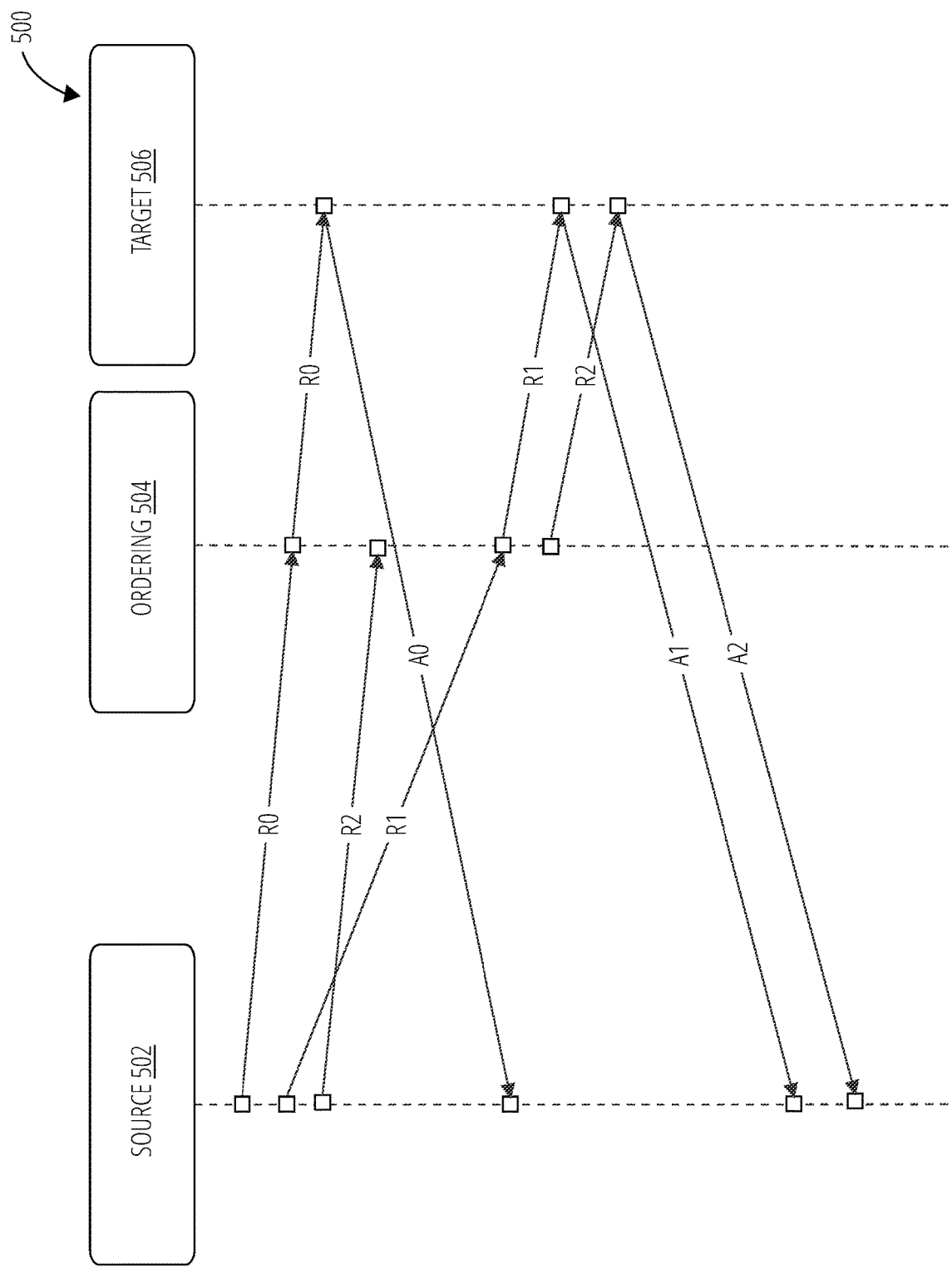
FIG. 5 illustrates a receiver-side ordering 500 in accordance with one embodiment.

Referring to FIG. 5, a receiver-side ordering 500 comprises a source 502, an ordering component 504, and a target 506. The source 502 sends requests, $R_0$, $R_1$, and $R_2$, to the target 506. The requests are an ordered domain in the sequence listed. The requests are received by the ordering component 504 before reaching the target 506. The ordering component 504 may be a reorder buffer. The requests are received by the ordering component 504 in the order $R_0$, $R_2$, and $R_1$. This is out-of-order as $R_2$ is dependent on $R_1$.

The ordering component 504 operates to send ordered streams to the target 506. Once $R_0$ is received, it is sent to the target 506, as $R_0$ was received in order. The target 506 sends a response acknowledgement, $A_0$, to the source 502. $R_2$ is held by the ordering component 504 until after $R_1$ is received. Once $R_1$ is received, $R_1$ is sent to the target 506, which then generates the response acknowledgement, $A_1$, to the source 502. After $R_1$ is sent to the target 506, $R_2$ is sent to the target 506, which then sends the response acknowledgement, $A_2$, to the source 502.

Figure 6:
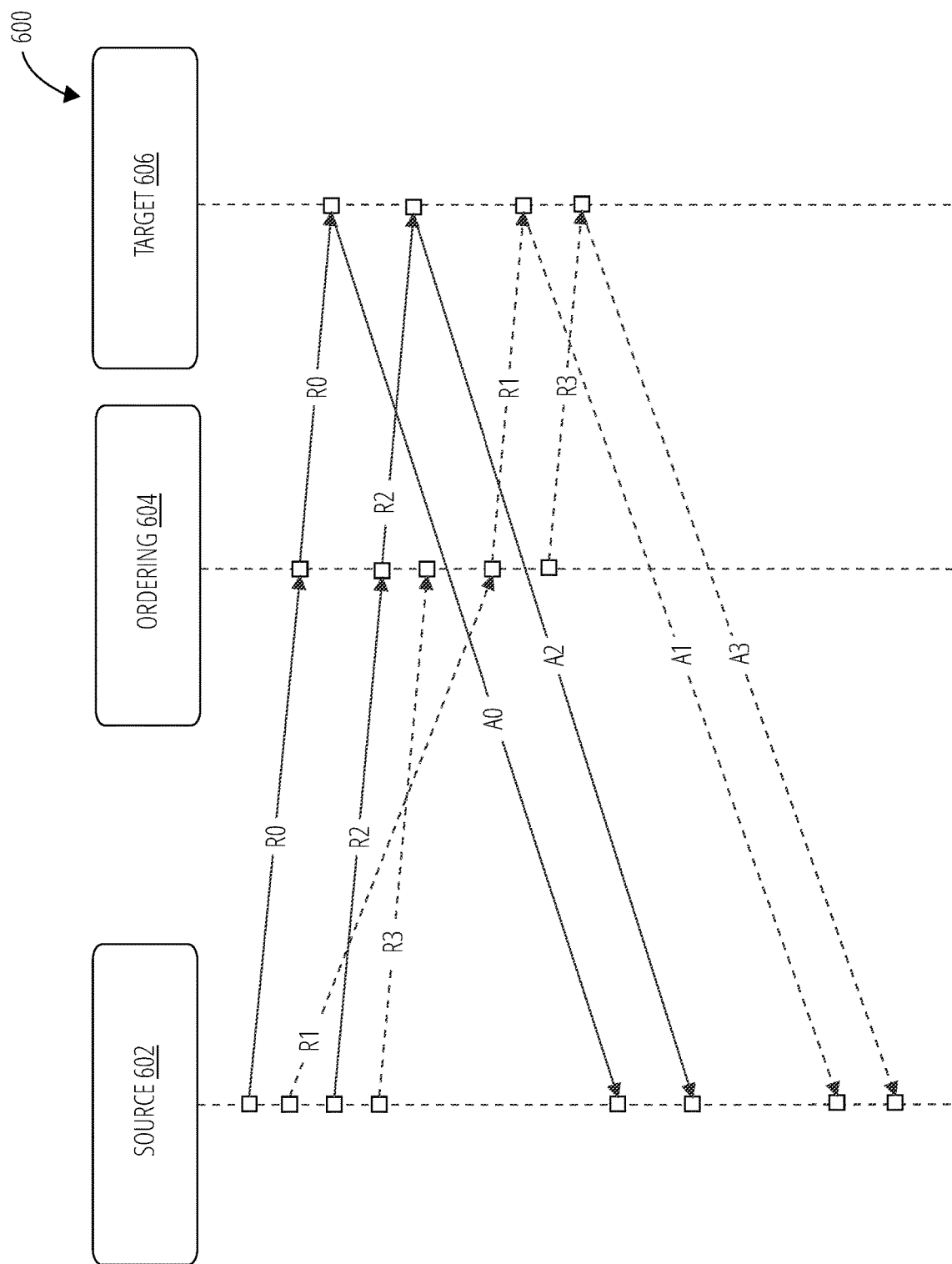
FIG. 6 illustrates a fine-grained ordering 600 in accordance with one embodiment.

Referring to FIG. 6, a fine-grained ordering 600 comprises a source 602, an ordering component 604, and a target 606. The source 602 send requests, $R_0$, $R_1$, $R_2$, and $R_3$, to the target 606. The requests comprise two ordering domains. The first ordering domain (solid arrow) is $R_0$, $R_2$ in sequence, and the second ordering domain (dashed arrow) is $R_1$, $R_3$ in sequence. The requests are received by the ordering component 604 before reaching the target 606. The ordering component 604 may be a reorder buffer. The requests are received by the ordering component 604 in the order $R_0$, $R_2$, $R_3$, and $R_1$. $R_0$ and $R_2$ are received in the order of their ordering domain. However, as $R_3$ is received prior to $R_1$, this is out-of-order as $R_3$ is dependent on $R_1$.

The ordering component 604 operates to send ordered streams to the target 606. Once $R_0$ is received, it is sent to the target 606, which sends a response acknowledgement, $A_0$, to the source 602. Once $R_2$ is received, it is sent to the target 606, which sends a response acknowledgement, $A_2$, to the source 602. $R_3$ is held by the ordering component 604 until after $R_1$ is received. Once $R_1$ is received, $R_1$ is sent to the target 606, which then generates the response acknowledgement, $A_1$, to the source 602. After $R_1$ is sent to the target 606, $R_3$ is sent to the target 606, which then sends the response acknowledgement, $A_3$, to the source 602.

Figure 7:
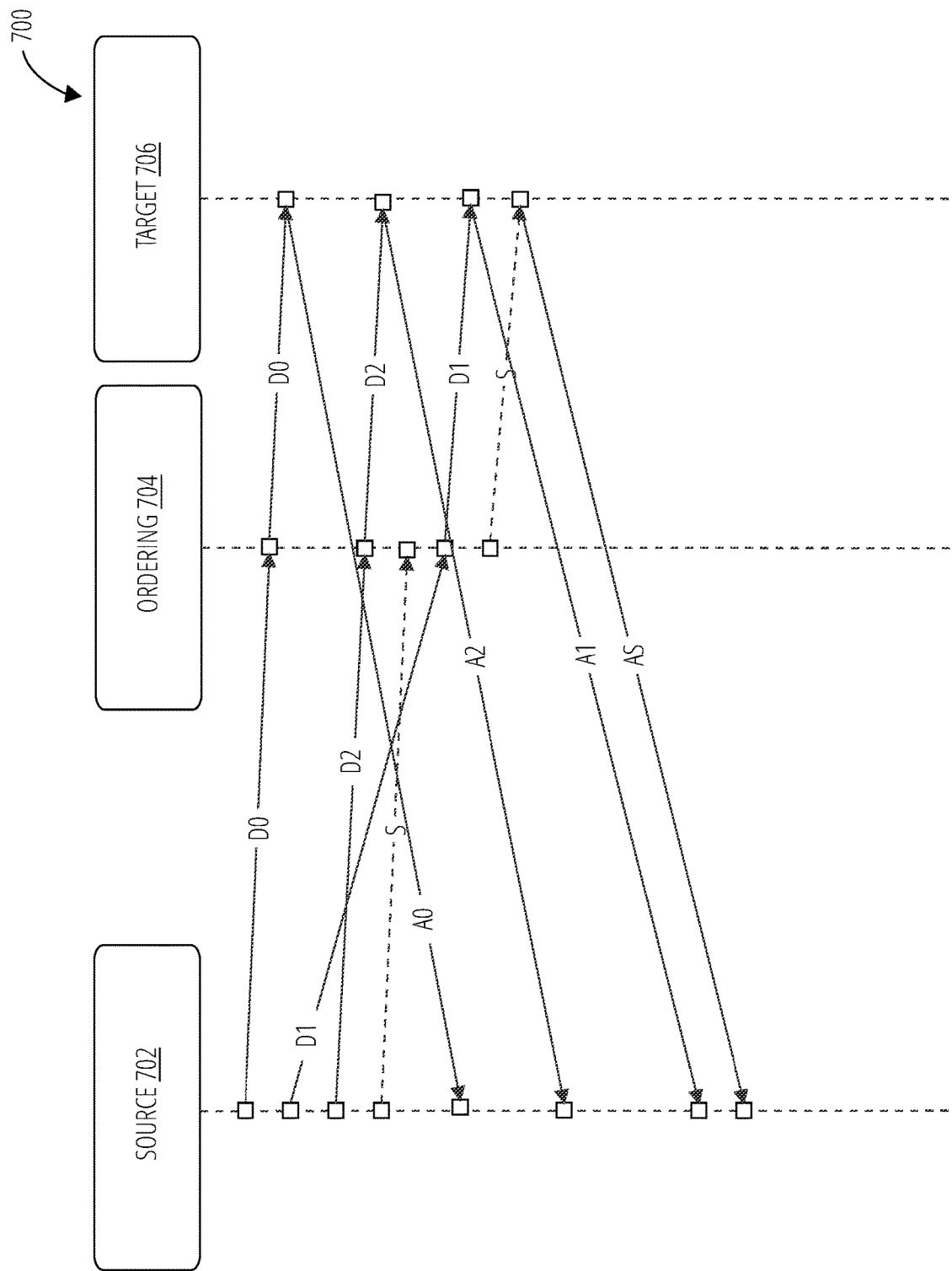
FIG. 7 illustrates a receiver-side synchronization operation 700 in accordance with one embodiment.

Referring to FIG. 7, a receiver-side synchronization operation 700 comprises a source 702, an ordering component 704, and a target 706. The source 702 sends a multi-packet transfer of three associated data operations, $D_0$, $D_1$, and $D_2$ (solid arrows), as well as a synchronization operation, S (dashed arrow), to the target 706. The associated data operations may be delivered in any order; however, as the synchronization operation is dependent on $D_0$, $D_1$, and $D_2$, the synchronization operation, S, is to be delivered to the target 706 after all associated data operations have become visible. The requests are received by the ordering component 704 before reaching the target 706. The ordering component 704 may be a reorder buffer. The packets are received by the ordering component 704 in the order, $D_0$, $D_2$, S, $D_1$. As S is received before all data operation $D_0$, $D_1$, and $D_2$ are received—$D_1$, is outstanding at the time S is received, S is delayed by the ordering component 704 until after $D_1$ is received and sent to the target 706.

S may include a count for the ordering component 704 to determine the number of associated data operations to be sent to the target 706 before the synchronization operation is to be sent to the target 706. The ordering component 704 may utilize accounting logic to determine when the associated data operations have been received and made visible to the target 706.

Once Do is received, it is sent to the target 706, which sends a response acknowledgement, $A_0$, to the source 702. Once $D_2$ is received, it is sent to the target 706, which sends a response acknowledgement, $A_2$, to the source 702. When S is received, the ordering component 704 determines whether each of the associated data operations have been received and made visible. As $D_1$ has not been received and made visible, S is delayed by the ordering component 704. Once $D_1$ is received, $D_1$ is sent to the target 706, which then generates the response acknowledgement, $A_1$, to the source 702. After $D_1$ is sent to the target 706, all associated data operations are visible and S is sent to the target 706, which then sends the response acknowledgement, AS, to the source 702.

Figure 8:
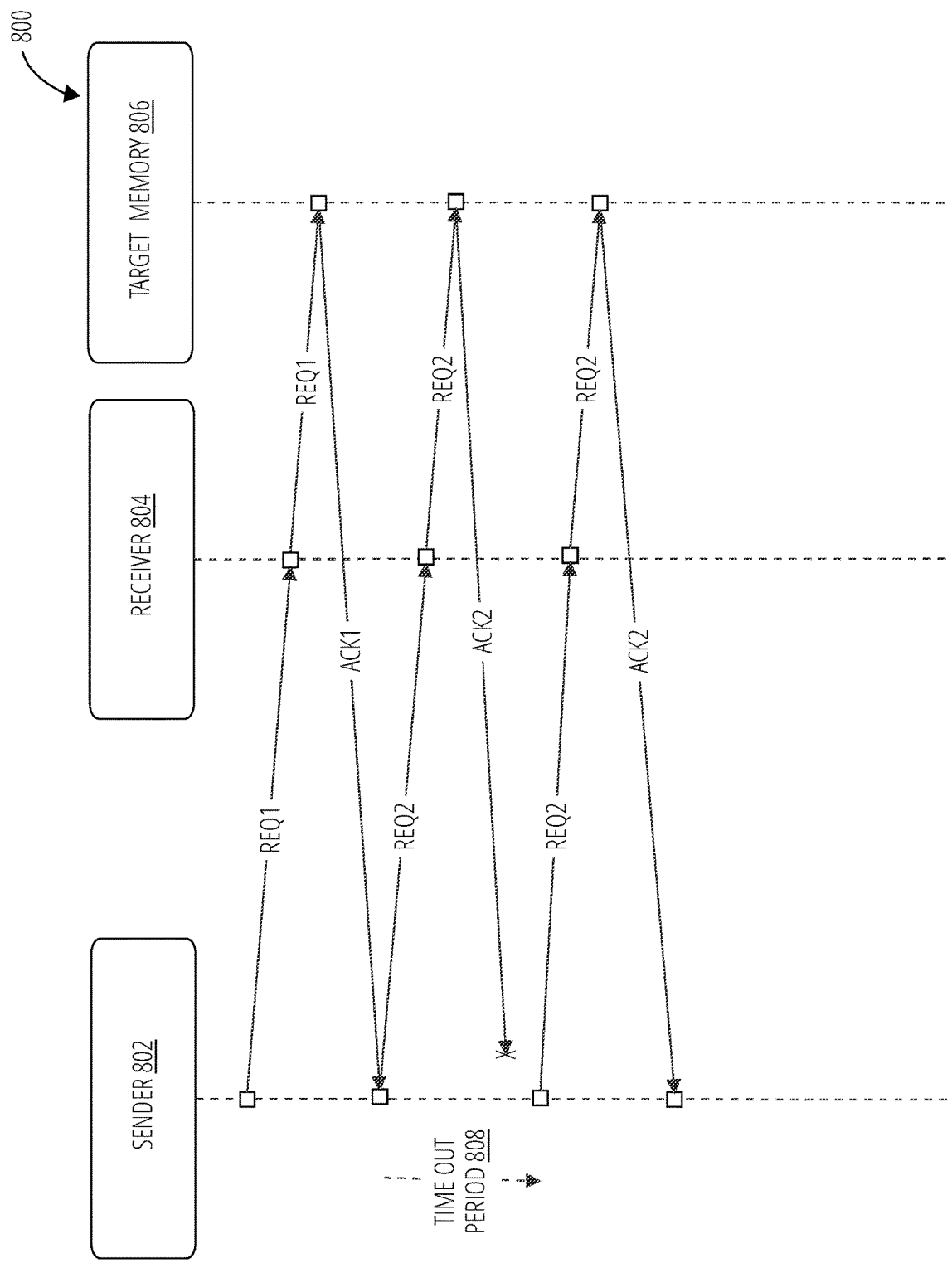
FIG. 8 illustrates a slow mode ordered transfer 800 in accordance with one embodiment.

Referring to FIG. 8, a slow mode ordered transfer 800 comprises a sender 802, a receiver 804, a target memory 806, and a time out period 808. The sender 802 may be a source device or transmitter device. Slow-mode ordered transfers serialize transfers in that there may be only one outstanding REQ packet and a REQ packet may only be sent after the ACK for the previous REQ was received. The resulting packet exchanges may be referred to as one-at-a-time transfers.

The sender 802 sends a first request, $REQ_1$, to the receiver 804, which sends $REQ_1$ to the target memory 806. In response, the target memory 806 sends a first acknowledgement, $ACK_1$, to the sender 802. The first transfer completes when the sender 802 receives $ACK_1$ in return for $REQ_1$.

The sender 802 then sends a second request, $REQ_2$, to the receiver 804, which sends $REQ_2$ to the target memory 806. In response, the target memory 806 sends a second acknowledgement, $ACK_2$, to the sender 802. The second transfer, however, does not complete as $ACK_2$ is lost (depicted as an "X"). The $REQ_2$ times out based on the time out period 808. The time out period 808 may be based on an assigned packet lifetime and an implemented non-byzantine packet failure mode. The packet lifetime may be enforced with a maximum hop count and a maximum switch and link-traversal time.

Once the time out period 808 has elapsed, $REQ_2$ is resent. When $REQ_2$ arrives at the receiver 804, $REQ_2$ is again forwarded to the target memory 806. Therefore, $REQ_2$ is delivered to the target memory 806 twice. This may be acceptable as exactly-once delivery was not specified, which is discussed in reference to FIG. 10. The target memory 806 sends the $ACK_2$ to the sender 802, and the transfer is complete when $ACK_2$ is received by the sender 802.

Figure 9:
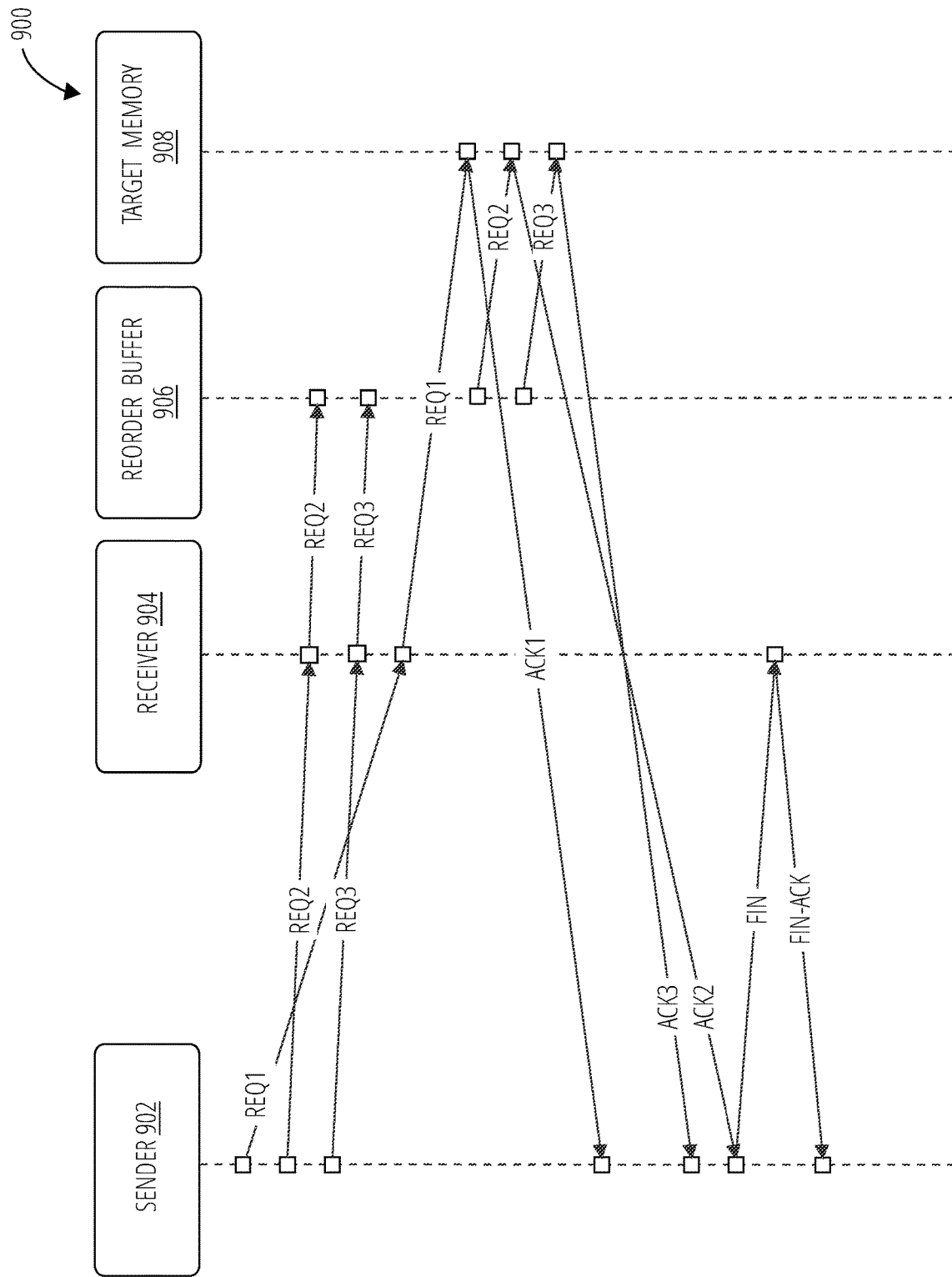
FIG. 9 illustrates a fast mode ordered transfer 900 in accordance with one embodiment.

Referring to FIG. 9, a fast mode ordered transfer 900 comprises a sender 902, a receiver 904, a reorder buffer 906, and a target memory 908. The sender 902 may be a source device or transmitter device. Fast-mode ordered transfers overlap packet transmission. Both the sender 902 and receiver 904 utilize connections to keep track of (multiple) outstanding REQs and to establish order when packets arrive out-of-order. FIG. 9 depicts an example of a sequence of three request packets $REQ_{1-3}$ transmitted as a fast ordered transfer.

The sender 902 sends a sequence of three REQ packets. The first REQ packet of a sequence, $REQ_1$, includes the SYN flag to inform the target of the start of a new sequence. Each REQ packet includes the connection identifier (CID) and a sequence number (SEQ). As the CID is unique only at the sender 902 and not at the receiver 904, the receiver 904 utilizes the tuple, {source endpoint ID, CID}, as a unique identifier of the connection and the associated state. The source and target endpoint IDs may be specified in each packet. These parameters and identifiers may be utilized to indicate a request to operate in the fast mode. The request may be rejected by sending a NACK in response to an out-of-order REQ that could not be stored in the reorder buffer or sending an ACK without the CON flag set in response to an in-order REQ that was forwarded to the target memory 908.

The sender 902 sends the burst of REQ packets, $REQ_1$, $REQ_2$, and $REQ_3$, to the receiver 904. The packets arrive out of order in that $REQ_1$ takes a longer path, and the packets arrive in the order $REQ_2$, $REQ_3$, $REQ_1$. $REQ_2$ arrives first and causes the receiver 904 to open a connection as no connection is yet in place. The first REQ received opens a new connection, whether it has the SYN flag set or not. As $REQ_2$ and $REQ_3$ are received out of order, they are kept in the reorder buffer 906 until $REQ_1$ is received. When $REQ_1$ arrives at the receiver 904, it is directly forwarded to the target memory 908. The arrival of $REQ_1$ further unblocks the delivery of $REQ_2$ and $REQ_3$, and the reorder buffer 906 sends $REQ_2$ and $REQ_3$ to the target memory 908.

Once the operations of the REQ packets have been reflected in the target memory 908, the corresponding ACK packets ($ACK_1$, $ACK_2$, and $ACK_3$) are returned. The ACK packets may have the CON flag, signifying that a connection has been established. Once all outstanding request packets have been acknowledged, the connection is explicitly closed with a FIN/FIN-ACK exchange (i.e., an explicit handshake).

The sender 902 sends the FIN to the receiver 904, which sends the FIN-ACK to the sender 902. The FIN and the FIN-ACK include the CID to determine which connection to close. The ACKs may be out of order when they arrive at the sender 902. As depicted, the ACKs arrive in the order $ACK_1$, $ACK_3$, $ACK_2$. Thus, the sender 902 may wait to pair every outstanding REQ with the corresponding ACK before the connection can be closed, instead of waiting merely for the ACK acknowledging the last sent REQ (here, $ACK_3$) to determine when the FIN may be sent. The FIN/FIN-ACK exchange is to explicitly close the connection and free the associated state at both the sender 902 and the receiver 904 so that it can be reused for another transfer. The FIN/FIN-ACK exchange may be initiated after the sender 902 determines that no data REQ or ACK packet is left in the network. Thus, the receiver 904 may close the connection upon receipt of FIN. Connection closure completes with the sender 902 receiving the FIN-ACK and removing its connection state (including freeing the connection ID).

Optimizing the protocol by merging FIN with the last data REQ may not be feasible as a connection state is removed that might be needed to detect a duplicate packet. Also, replacing the FIN/FIN-ACK exchange with a timeout that triggers connection closure is inefficient in that the connection state remains tied up longer. The connection state is a resource that indirectly determines the number of outstanding REQs. In some embodiments, the receiver 904 may return the ACKs in order, with the ACKs functioning as fences. Thus, when the sender 902 receives $ACK_3$ as depicted in FIG. 9, each of $REQ_1$, $REQ_2$, and $REQ_3$ have become visible in the target memory 908.

Figure 10:
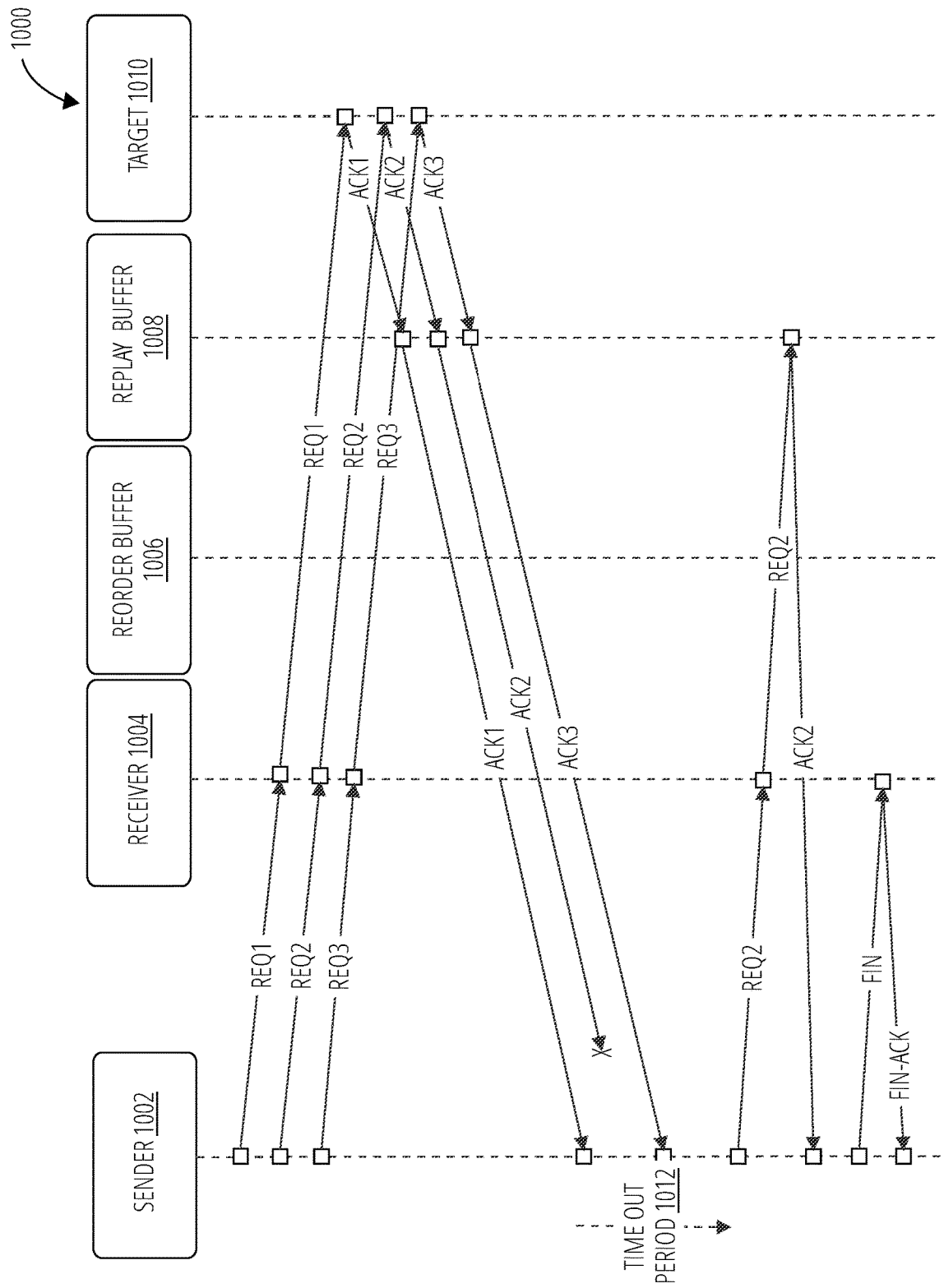
FIG. 10 illustrates an exactly-once delivery 1000 in accordance with one embodiment.

Referring to FIG. 10, an exactly-once delivery 1000 comprises a sender 1002, a receiver 1004, a reorder buffer 1006, a replay buffer 1008, a target 1010, and a time out period 1012. The sender 1002 may be a source device or transmitter device. The sender 1002 transfers three ordered requests $REQ_{1-3}$ requiring exactly-once delivery (as indicated by the EOD flag) to the receiver 1004. The receiver 1004 sends the REQs to the target 1010. Upon receipt, the target 1010 executes the operations of the REQs. The results of the operations may be stored in the replay buffer 1008. The replay buffer 1008 returns the results in $ACK_{1-3}$ to the sender 1002. The ACK packets may have the CON flag, signifying that a connection has been established.

However, $ACK_2$ is lost during transfer from the replay buffer 1008 to the sender 1002 (depicted by an "X"). As a result, the time out period 1012 elapses and causes the sender 1002 to resend $REQ_2$. The time out period 1012 may be based on an assigned packet lifetime and an implemented non-byzantine packet failure mode. The packet lifetime may be enforced with a maximum hop count and a maximum switch and link-traversal time. The sender 902 may utilize a retransmission buffer to resend $REQ_2$. The retransmitted $REQ_2$ utilizes the SYN flag, as $ACK_1$ was received. The receiver 1004 utilizes logic to recognize $REQ_2$ as a duplicate packet and regenerates $ACK_2$ by replaying the result. The receiver 1004 retrieves $ACK_2$ from the replay buffer 1008. A duplicate REQ is not to be forwarded to the target 1010 as the REQ may include a non-idempotent operation whose re-execution may generate a result different from the original result. The replay buffer 1008 sends $ACK_2$ to the sender 1002. When the sender 1002 receives $ACK_2$, all REQs have been acknowledged and the connection may be torn down by initiating a FIN/FIN-ACK exchange.

Similar to the reorder buffer 1006, the replay buffer 1008 is a resource that is operated by allocation and deallocation. When a REQ is forwarded to the target 1010, the replay buffer 1008 is allocated. Once the REQ is determined to be unable to be resent, the replay buffer 1008 holding the corresponding ACK may be deallocated. $ACK_1$ may be removed from the replay buffer 1008 when $REQ_2$ with the SYN flag set (i.e., the retransmitted $REQ_2$) is received at the receiver 1004. $ACK_2$ and $ACK_3$ may be deallocated when FIN is received at the receiver 1004.

The reorder buffer 1006 is not utilized as depicted in FIG. 10; however, the reorder buffer 1006 may perform reordering of the REQs if received out of order (FIG. 10 depicts the REQs received in order). The receiver 1004 comprises logic to determine a duplicate packet. The receiver 1004 keeps track of the last sequence number forwarded to the target 1010. If a REQ is received with a sequence number less than or equal to the sequence number of last forwarded REQ, it is a duplicate packet.

Figure 11:
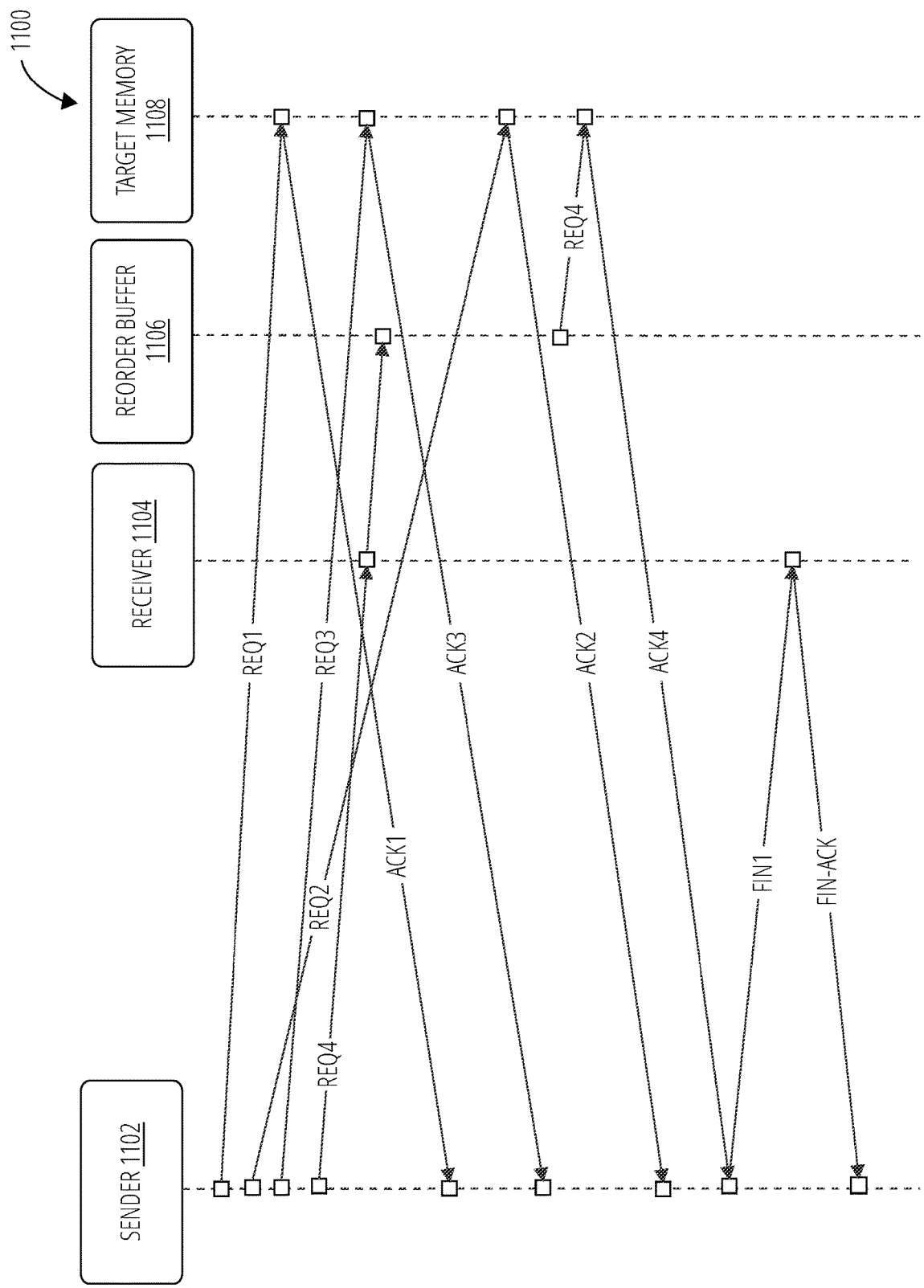
FIG. 11 illustrates a synchronized transfer 1100 in accordance with one embodiment.

Referring to FIG. 11, a synchronized transfer 1100 comprises a sender 1102, a receiver 1104, a reorder buffer 1106, and a target memory 1108. The sender 1102 may be a source device or transmitter device. A synchronized transfer corresponds to a multi-data packet transfer followed by a synchronization operation as found in producer/consumer communication patterns. While data packets may be delivered in any order, the packet with the synchronization operation is delivered after all other data packets are delivered.

The sender 1102 sends four request packets, $REQ_{1-4}$. The first three requests, $REQ_1$, $REQ_2$, and $REQ_3$, are the multi-data packet transfer while the last request $REQ_4$ includes the synchronization operation. As the synchronization operation is a non-idempotent operation, the EOD flag is set. As depicted in FIG. 11, the packets transporting the data may be directly forwarded into target memory 1108 upon arrival, even if they arrive out of order. As the synchronization operation included in $REQ_4$ must not be executed before the transfer of the data packet completes, $REQ_4$ is held back in the reorder buffer 1106. The target memory 1108 generates the ACK responses for each of the $REQ_{1-3}$ and sends the ACK responses to the sender 1102. The ACK packets may have the CON flag, signifying that a connection has been established. The receiver 1104 is utilized to send the ACK responses to the sender 1102. The receiver 1104 counts the ACKs returned from the target memory 1108 (or target memories) to determine that the data packet transfers have completed. The number of ACKs to be accounted for is given by the count CNT provided in the REQ that includes the synchronization operation (here, $REQ_4$). Once the ACKs for the transfers of the data packets are accounted for, $REQ_4$ (with the synchronization operation) is forwarded to the target memory 1108. $ACK_4$ is then sent to the sender 1102. Once all REQs have been acknowledged by the sender 1102, the connection is torn down by a FIN/FIN-ACK exchange. Note that ACKs may be received unordered, and receipt of $ACK_4$ does not initiate the FIN/FIN-ACK exchange. Rather, all ACKs are accounted for by the sender 1102 before the connection is closed.

Various embodiments of devices and systems that may utilize the disclosed communication techniques will now be described. For example the devices described below may utilize the disclosed techniques to communication over interconnects, busses, or links as described.

Parallel Processing Unit

Figure 12:
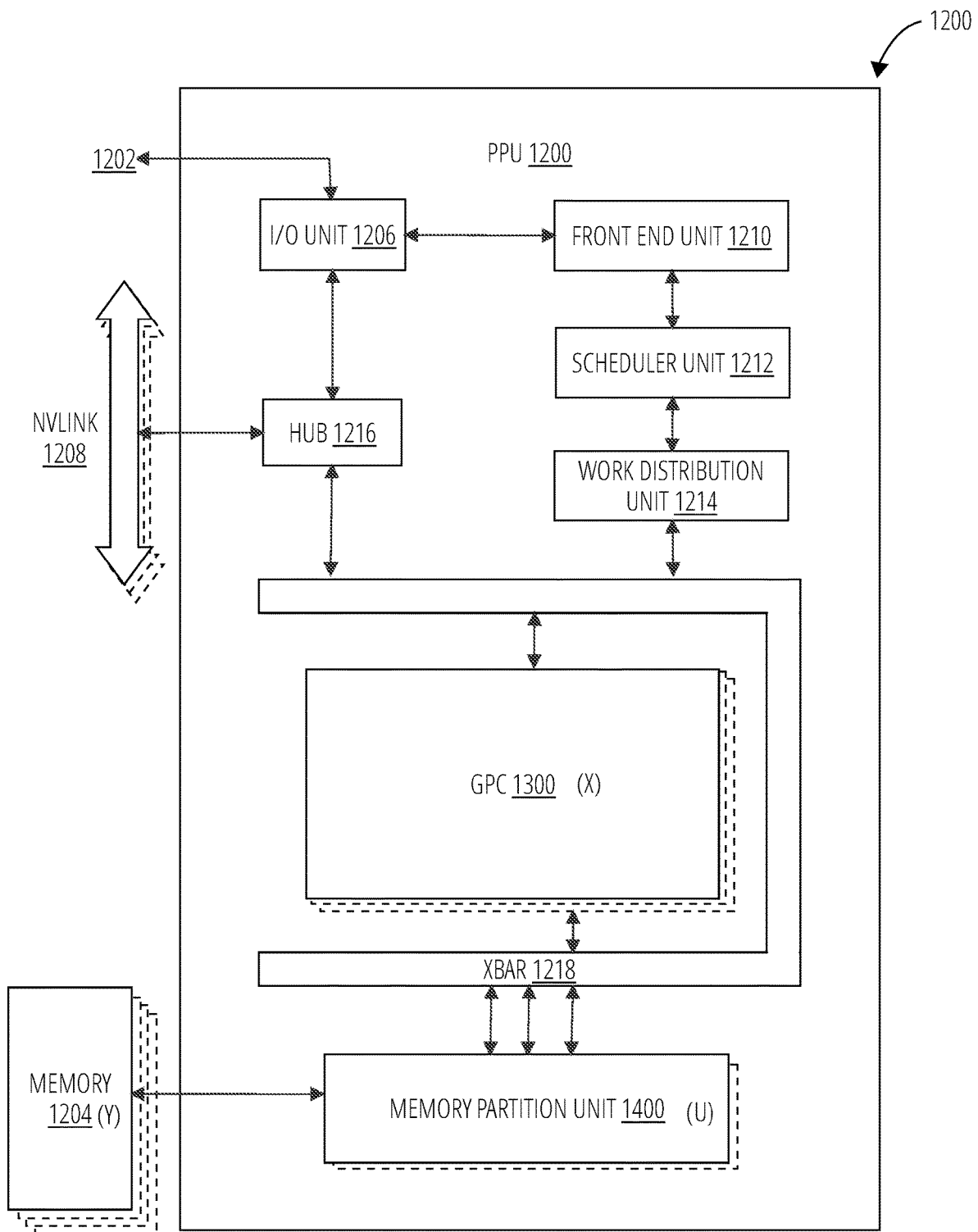
FIG. 12 illustrates a parallel processing unit 1200 in accordance with one embodiment.

FIG. 12 illustrates a parallel processing unit 1200, in accordance with an embodiment. In an embodiment, the parallel processing unit 1200 is a multi-threaded processor that is implemented on one or more integrated circuit devices. The parallel processing unit 1200 is a latency hiding architecture designed to process many threads in parallel. A thread (e.g., a thread of execution) is an instantiation of a set of instructions configured to be executed by the parallel processing unit 1200. In an embodiment, the parallel processing unit 1200 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the parallel processing unit 1200 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more parallel processing unit 1200 modules may be configured to accelerate thousands of High Performance Computing (HPC), data center, and machine learning applications. The parallel processing unit 1200 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 12, the parallel processing unit 1200 includes an I/O unit 1206, a front end unit 1210, a scheduler unit 1212, a work distribution unit 1214, a hub 1216, a crossbar 1218, one or more GPC 1300 modules, and one or more memory partition unit 1400 modules. The parallel processing unit 1200 may be connected to a host processor or other parallel processing unit 1200 modules via one or more high-speed NVLink 1208 interconnects. The parallel processing unit 1200 may be connected to a host processor or other peripheral devices via an interconnect 1202. The parallel processing unit 1200 may also be connected to a local memory comprising a number of memory 1204 devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 1208 interconnect enables systems to scale and include one or more parallel processing unit 1200 modules combined with one or more CPUs, supports cache coherence between the parallel processing unit 1200 modules and CPUs, and CPU mastering. Data and/or commands may be transmitted by the NVLink 1208 through the hub 1216 to/from other units of the parallel processing unit 1200 such as one or more copy engines, a video encoder, a video decoder, a power management unit, etc. (not explicitly shown). The NVLink 1208 is described in more detail in conjunction with FIG. 16.

The I/O unit 1206 is configured to transmit and receive communications (e.g., commands, data, etc.) from a host processor (not shown) over the interconnect 1202. The I/O unit 1206 may communicate with the host processor directly via the interconnect 1202 or through one or more intermediate devices such as a memory bridge. In an embodiment, the I/O unit 1206 may communicate with one or more other processors, such as one or more parallel processing unit 1200 modules via the interconnect 1202. In an embodiment, the I/O unit 1206 implements a Peripheral Component Interconnect Express (PCIe) interface for communications over a PCIe bus and the interconnect 1202 is a PCIe bus. In alternative embodiments, the I/O unit 1206 may implement other types of well-known interfaces for communicating with external devices.

The I/O unit 1206 decodes packets received via the interconnect 1202. In an embodiment, the packets represent commands configured to cause the parallel processing unit 1200 to perform various operations. The I/O unit 1206 transmits the decoded commands to various other units of the parallel processing unit 1200 as the commands may specify. For example, some commands may be transmitted to the front end unit 1210. Other commands may be transmitted to the hub 1216 or other units of the parallel processing unit 1200 such as one or more copy engines, a video encoder, a video decoder, a power management unit, etc. (not explicitly shown). In other words, the I/O unit 1206 is configured to route communications between and among the various logical units of the parallel processing unit 1200.

In an embodiment, a program executed by the host processor encodes a command stream in a buffer that provides workloads to the parallel processing unit 1200 for processing. A workload may comprise several instructions and data to be processed by those instructions. The buffer is a region in a memory that is accessible (e.g., read/write) by both the host processor and the parallel processing unit 1200. For example, the I/O unit 1206 may be configured to access the buffer in a system memory connected to the interconnect 1202 via memory requests transmitted over the interconnect 1202. In an embodiment, the host processor writes the command stream to the buffer and then transmits a pointer to the start of the command stream to the parallel processing unit 1200. The front end unit 1210 receives pointers to one or more command streams. The front end unit 1210 manages the one or more streams, reading commands from the streams and forwarding commands to the various units of the parallel processing unit 1200.

The front end unit 1210 is coupled to a scheduler unit 1212 that configures the various GPC 1300 modules to process tasks defined by the one or more streams. The scheduler unit 1212 is configured to track state information related to the various tasks managed by the scheduler unit 1212. The state may indicate which GPC 1300 a task is assigned to, whether the task is active or inactive, a priority level associated with the task, and so forth. The scheduler unit 1212 manages the execution of a plurality of tasks on the one or more GPC 1300 modules.

The scheduler unit 1212 is coupled to a work distribution unit 1214 that is configured to dispatch tasks for execution on the GPC 1300 modules. The work distribution unit 1214 may track a number of scheduled tasks received from the scheduler unit 1212. In an embodiment, the work distribution unit 1214 manages a pending task pool and an active task pool for each of the GPC 1300 modules. The pending task pool may comprise a number of slots (e.g., 32 slots) that contain tasks assigned to be processed by a particular GPC 1300. The active task pool may comprise a number of slots (e.g., 4 slots) for tasks that are actively being processed by the GPC 1300 modules. As a GPC 1300 finishes the execution of a task, that task is evicted from the active task pool for the GPC 1300 and one of the other tasks from the pending task pool is selected and scheduled for execution on the GPC 1300. If an active task has been idle on the GPC 1300, such as while waiting for a data dependency to be resolved, then the active task may be evicted from the GPC 1300 and returned to the pending task pool while another task in the pending task pool is selected and scheduled for execution on the GPC 1300.

The work distribution unit 1214 communicates with the one or more GPC 1300 modules via crossbar 1218. The crossbar 1218 is an interconnect network that couples many of the units of the parallel processing unit 1200 to other units of the parallel processing unit 1200. For example, the crossbar 1218 may be configured to couple the work distribution unit 1214 to a particular GPC 1300. Although not shown explicitly, one or more other units of the parallel processing unit 1200 may also be connected to the crossbar 1218 via the hub 1216.

The tasks are managed by the scheduler unit 1212 and dispatched to a GPC 1300 by the work distribution unit 1214. The GPC 1300 is configured to process the task and generate results. The results may be consumed by other tasks within the GPC 1300, routed to a different GPC 1300 via the crossbar 1218, or stored in the memory 1204. The results can be written to the memory 1204 via the memory partition unit 1400 modules, which implement a memory interface for reading and writing data to/from the memory 1204. The results can be transmitted to another parallel processing unit 1200 or CPU via the NVLink 1208. In an embodiment, the parallel processing unit 1200 includes a number U of memory partition unit 1400 modules that is equal to the number of separate and distinct memory 1204 devices coupled to the parallel processing unit 1200. A memory partition unit 1400 will be described in more detail below in conjunction with FIG. 14.

In an embodiment, a host processor executes a driver kernel that implements an application programming interface (API) that enables one or more applications executing on the host processor to schedule operations for execution on the parallel processing unit 1200. In an embodiment, multiple compute applications are simultaneously executed by the parallel processing unit 1200 and the parallel processing unit 1200 provides isolation, quality of service (QoS), and independent address spaces for the multiple compute applications. An application may generate instructions (e.g., API calls) that cause the driver kernel to generate one or more tasks for execution by the parallel processing unit 1200. The driver kernel outputs tasks to one or more streams being processed by the parallel processing unit 1200. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 15.

Figure 13:
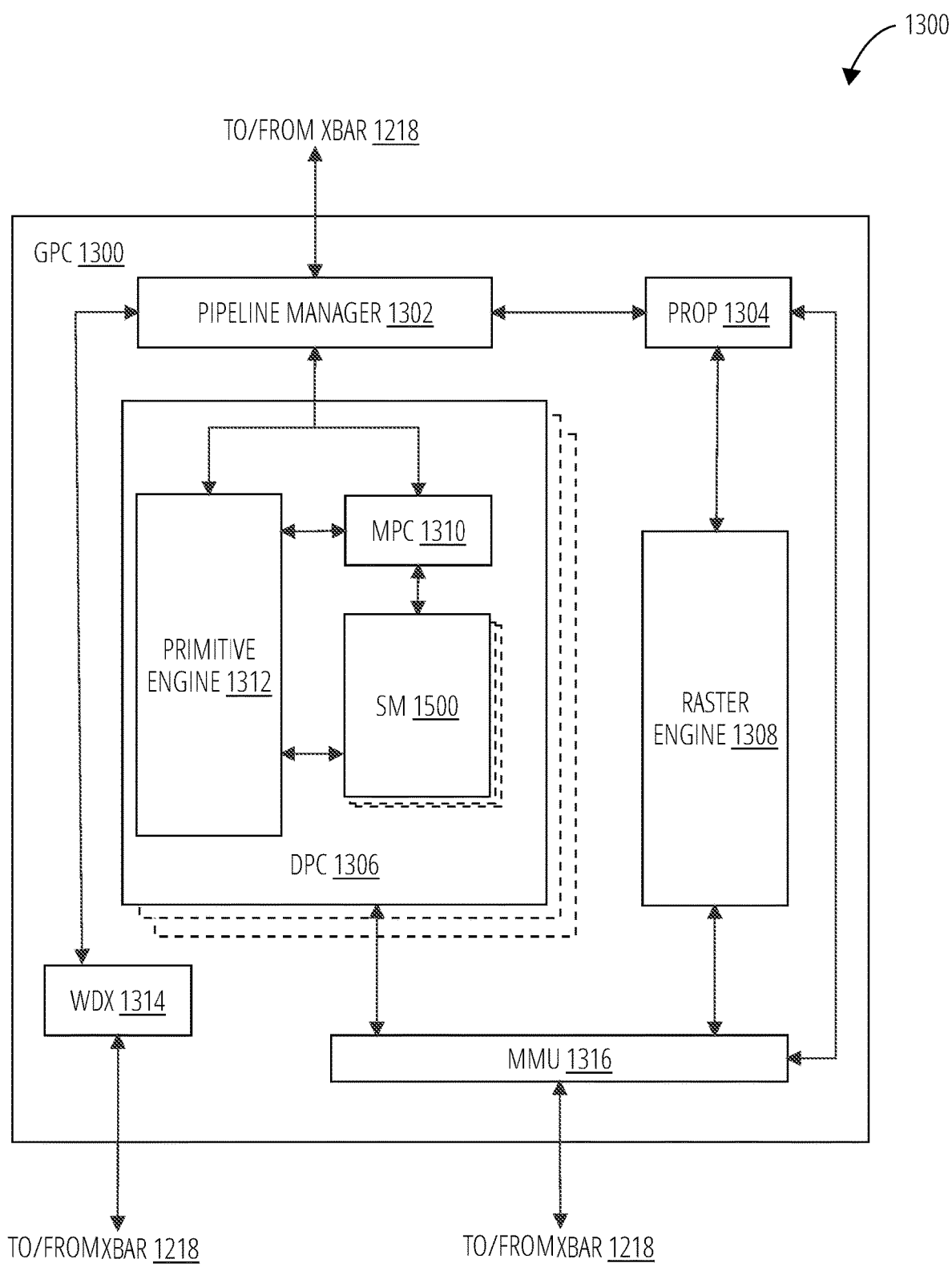
FIG. 13 illustrates a GPC 1300 in accordance with one embodiment.

FIG. 13 illustrates a GPC 1300 of the parallel processing unit 1200 of FIG. 12, in accordance with an embodiment. As shown in FIG. 13, each GPC 1300 includes a number of hardware units for processing tasks. In an embodiment, each GPC 1300 includes a pipeline manager 1302, a PROP 1304, a raster engine 1308, a WDX 1314, an MMU 1316, and one or more DPC 1306. It will be appreciated that the GPC 1300 of FIG. 13 may include other hardware units in lieu of or in addition to the units shown in FIG. 13.

In an embodiment, the operation of the GPC 1300 is controlled by the pipeline manager 1302. The pipeline manager 1302 manages the configuration of the one or more DPC 1306 modules for processing tasks allocated to the GPC 1300. In an embodiment, the pipeline manager 1302 may configure at least one of the one or more DPC 1306 modules to implement at least a portion of a graphics rendering pipeline. For example, a DPC 1306 may be configured to execute a vertex shader program on the programmable SM 1500. The pipeline manager 1302 may also be configured to route packets received from the work distribution unit 1214 to the appropriate logical units within the GPC 1300. For example, some packets may be routed to fixed function hardware units in the PROP 1304 and/or raster engine 1308 while other packets may be routed to the DPC 1306 modules for processing by the primitive engine 1312 or the SM 1500. In an embodiment, the pipeline manager 1302 may configure at least one of the one or more DPC 1306 modules to implement a neural network model and/or a computing pipeline.

Figure 14:
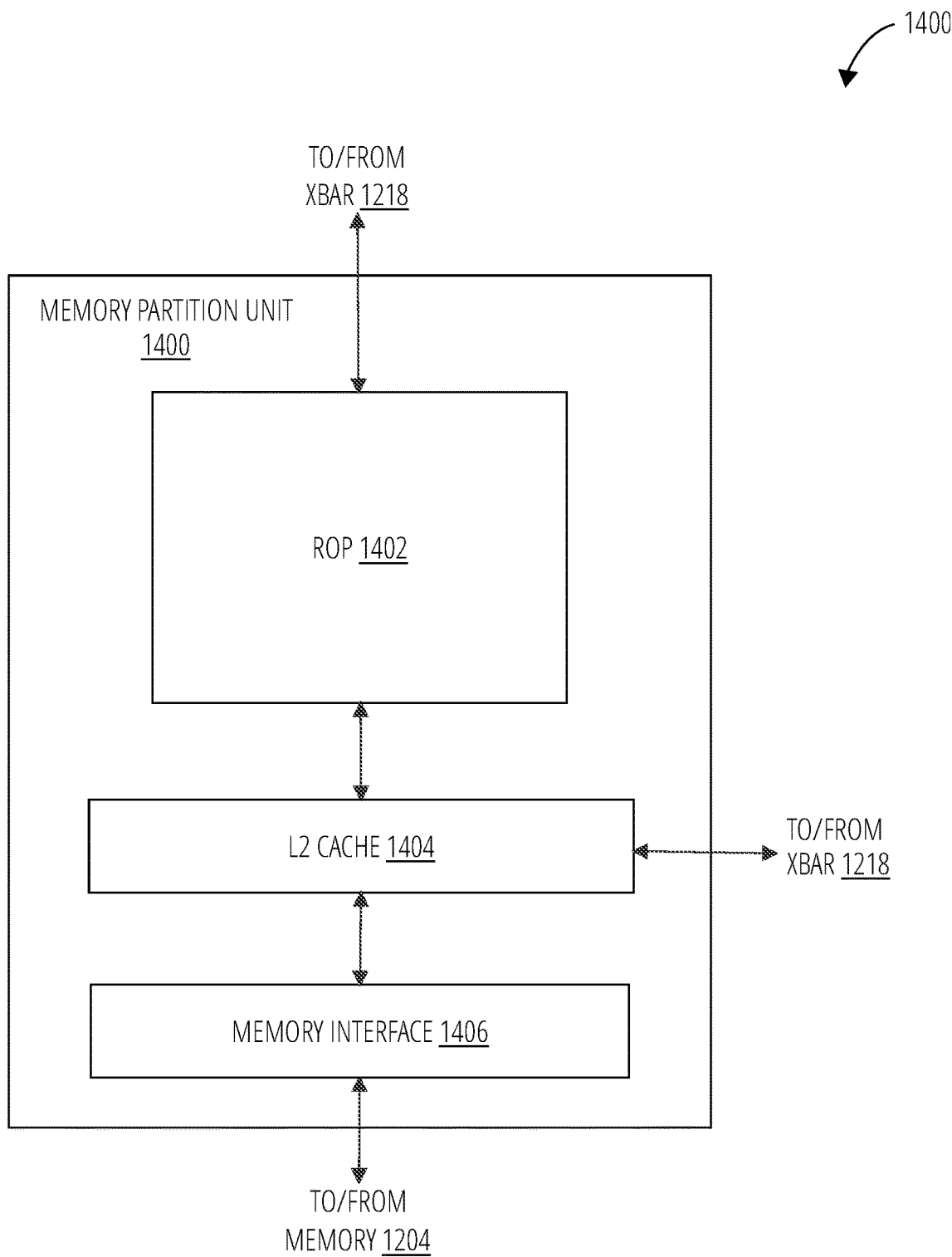
FIG. 14 illustrates a memory partition unit 1400 in accordance with one embodiment.

The PROP 1304 is configured to route data generated by the raster engine 1308 and the DPC 1306 modules to a Raster Operations (ROP) unit, described in more detail in conjunction with FIG. 14. The PROP 1304 may also be configured to perform optimizations for color blending, organize pixel data, perform address translations, and the like.

The raster engine 1308 includes a number of fixed function hardware units configured to perform various raster operations. In an embodiment, the raster engine 1308 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x, y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 1308 comprises fragments to be processed, for example, by a fragment shader implemented within a DPC 1306.

Each DPC 1306 included in the GPC 1300 includes an MPC 1310, a primitive engine 1312, and one or more SM 1500 modules. The MPC 1310 controls the operation of the DPC 1306, routing packets received from the pipeline manager 1302 to the appropriate units in the DPC 1306. For example, packets associated with a vertex may be routed to the primitive engine 1312, which is configured to fetch vertex attributes associated with the vertex from the memory 1204. In contrast, packets associated with a shader program may be transmitted to the SM 1500.

The SM 1500 comprises a programmable streaming processor that is configured to process tasks represented by a number of threads. Each SM 1500 is multi-threaded and configured to execute a plurality of threads (e.g., 32 threads) from a particular group of threads concurrently. In an embodiment, the SM 1500 implements a Single-Instruction, Multiple-Data (SIMD) architecture where each thread in a group of threads (e.g., a warp) is configured to process a different set of data based on the same set of instructions. All threads in the group of threads execute the same instructions. In another embodiment, the SM 1500 implements a Single-Instruction, Multiple Thread (SIMT) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 1500 will be described in more detail below in conjunction with FIG. 15.

The MMU 1316 provides an interface between the GPC 1300 and the memory partition unit 1400. The MMU 1316 may provide translation of virtual addresses into physical addresses, memory protection, and arbitration of memory requests. In an embodiment, the MMU 1316 provides one or more translation lookaside buffers (TLBs) for performing translation of virtual addresses into physical addresses in the memory 1204.

FIG. 14 illustrates a memory partition unit 1400 of the parallel processing unit 1200 of FIG. 12, in accordance with an embodiment. As shown in FIG. 14, the memory partition unit 1400 includes a ROP 1402, an L2 cache 1404, and a memory interface 1406. The memory interface 1406 is coupled to the memory 1204. Memory interface 1406 may implement 32, 64, 128, 1024-bit data buses, or the like, for high-speed data transfer. In an embodiment, the parallel processing unit 1200 incorporates U memory interface 1406 modules, one memory interface 1406 per pair of memory partition unit 1400 modules, where each pair of memory partition unit 1400 modules is connected to a corresponding memory 1204 device. For example, parallel processing unit 1200 may be connected to up to Y memory 1204 devices, such as high bandwidth memory stacks or graphics double-data-rate, version 5, synchronous dynamic random access memory, or other types of persistent storage.

In an embodiment, the memory interface 1406 implements an HBM2 memory interface and Y equals half U. In an embodiment, the HBM2 memory stacks are located on the same physical package as the parallel processing unit 1200, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 1204 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where parallel processing unit 1200 modules process very large datasets and/or run applications for extended periods.

In an embodiment, the parallel processing unit 1200 implements a multi-level memory hierarchy. In an embodiment, the memory partition unit 1400 supports a unified memory to provide a single unified virtual address space for CPU and parallel processing unit 1200 memory, enabling data sharing between virtual memory systems. In an embodiment the frequency of accesses by a parallel processing unit 1200 to memory located on other processors is traced to ensure that memory pages are moved to the physical memory of the parallel processing unit 1200 that is accessing the pages more frequently. In an embodiment, the NVLink 1208 supports address translation services allowing the parallel processing unit 1200 to directly access a CPU's page tables and providing full access to CPU memory by the parallel processing unit 1200.

In an embodiment, copy engines transfer data between multiple parallel processing unit 1200 modules or between parallel processing unit 1200 modules and CPUs. The copy engines can generate page faults for addresses that are not mapped into the page tables. The memory partition unit 1400 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 1204 or other system memory may be fetched by the memory partition unit 1400 and stored in the L2 cache 1404, which is located on-chip and is shared between the various GPC 1300 modules. As shown, each memory partition unit 1400 includes a portion of the L2 cache 1404 associated with a corresponding memory 1204 device. Lower level caches may then be implemented in various units within the GPC 1300 modules. For example, each of the SM 1500 modules may implement an L1 cache. The L1 cache is private memory that is dedicated to a particular SM 1500. Data from the L2 cache 1404 may be fetched and stored in each of the L1 caches for processing in the functional units of the SM 1500 modules. The L2 cache 1404 is coupled to the memory interface 1406 and the crossbar 1218.

The ROP 1402 performs graphics raster operations related to pixel color, such as color compression, pixel blending, and the like. The ROP 1402 also implements depth testing in conjunction with the raster engine 1308, receiving a depth for a sample location associated with a pixel fragment from the culling engine of the raster engine 1308. The depth is tested against a corresponding depth in a depth buffer for a sample location associated with the fragment. If the fragment passes the depth test for the sample location, then the ROP 1402 updates the depth buffer and transmits a result of the depth test to the raster engine 1308. It will be appreciated that the number of partition memory partition unit 1400 modules may be different than the number of GPC 1300 modules and, therefore, each ROP 1402 may be coupled to each of the GPC 1300 modules. The ROP 1402 tracks packets received from the different GPC 1300 modules and determines which GPC 1300 that a result generated by the ROP 1402 is routed to through the crossbar 1218. Although the ROP 1402 is included within the memory partition unit 1400 in FIG. 14, in other embodiments, the ROP 1402 may be outside of the memory partition unit 1400. For example, the ROP 1402 may reside in the GPC 1300 or another unit.

Figure 15:
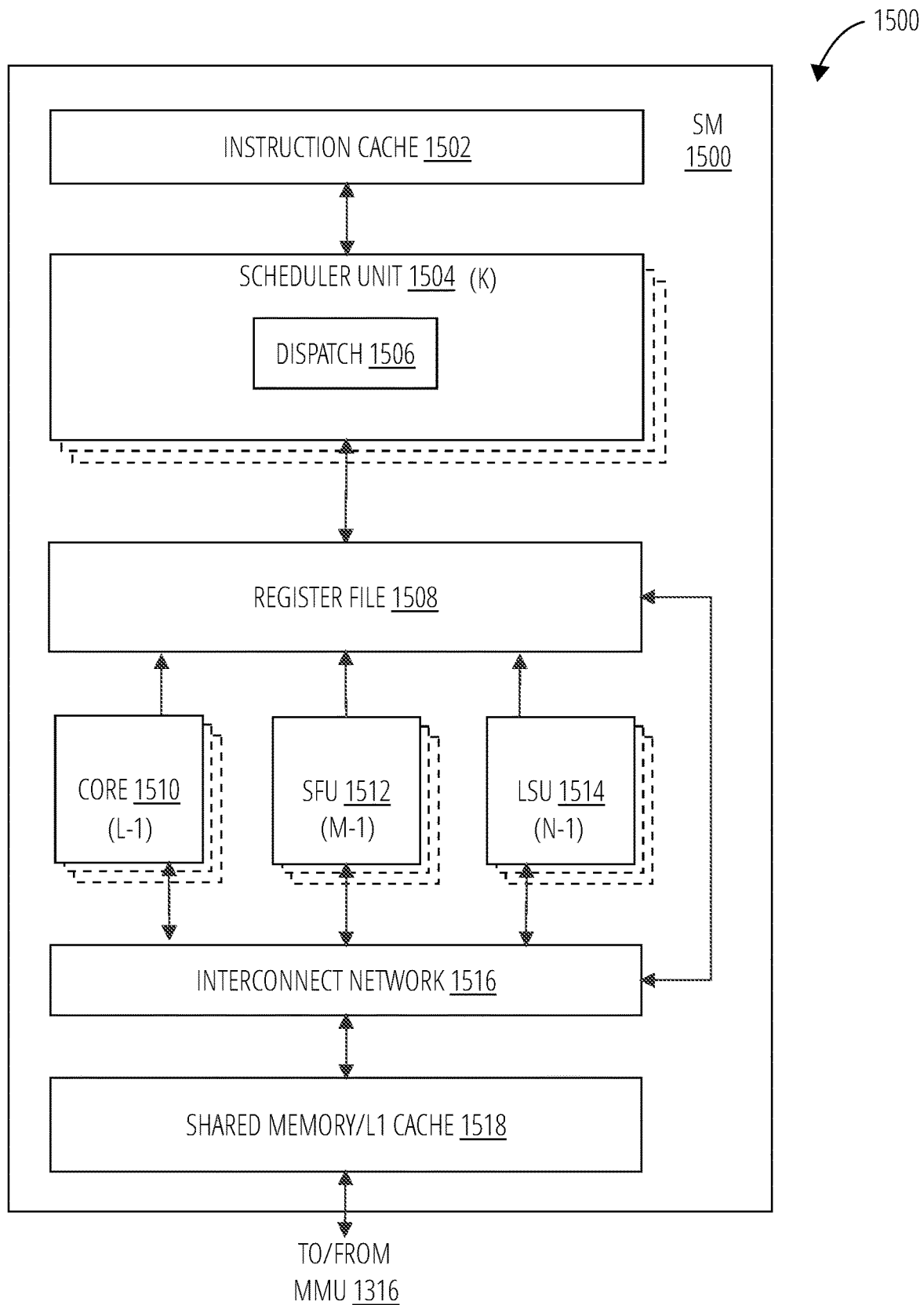
FIG. 15 illustrates an SM 1500 in accordance with one embodiment.

FIG. 15 illustrates the SM 1500 of FIG. 13, in accordance with an embodiment. As shown in FIG. 15, the SM 1500 includes an instruction cache 1502, one or more scheduler unit 1504 modules (e.g., such as scheduler unit 1212), a register file 1508, one or more processing core 1510 modules, one or more SFU 1512 modules, one or more LSU 1514 modules, an interconnect network 1516, and a shared memory/L1 cache 1518.

As described above, the work distribution unit 1214 dispatches tasks for execution on the GPC 1300 modules of the parallel processing unit 1200. The tasks are allocated to a particular DPC 1306 within a GPC 1300 and, if the task is associated with a shader program, the task may be allocated to an SM 1500. The scheduler unit 1212 receives the tasks from the work distribution unit 1214 and manages instruction scheduling for one or more thread blocks assigned to the SM 1500. The scheduler unit 1504 schedules thread blocks for execution as warps of parallel threads, where each thread block is allocated at least one warp. In an embodiment, each warp executes 32 threads. The scheduler unit 1504 may manage a plurality of different thread blocks, allocating the warps to the different thread blocks and then dispatching instructions from the plurality of different cooperative groups to the various functional units (e.g., core 1510 modules, SFU 1512 modules, and LSU 1514 modules) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch 1506 unit is configured within the scheduler unit 1504 to transmit instructions to one or more of the functional units. In one embodiment, the scheduler unit 1504 includes two dispatch 1506 units that enable two different instructions from the same warp to be dispatched during each clock cycle. In alternative embodiments, each scheduler unit 1504 may include a single dispatch 1506 unit or additional dispatch 1506 units.

Each SM 1500 includes a register file 1508 that provides a set of registers for the functional units of the SM 1500. In an embodiment, the register file 1508 is divided between each of the functional units such that each functional unit is allocated a dedicated portion of the register file 1508. In another embodiment, the register file 1508 is divided between the different warps being executed by the SM 1500. The register file 1508 provides temporary storage for operands connected to the data paths of the functional units.

Each SM 1500 comprises L processing core 1510 modules. In an embodiment, the SM 1500 includes a large number (e.g., 128, etc.) of distinct processing core 1510 modules. Each core 1510 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the core 1510 modules include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the core 1510 modules. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A'B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 1500 also comprises M SFU 1512 modules that perform special functions (e.g., attribute evaluation, reciprocal square root, and the like). In an embodiment, the SFU 1512 modules may include a tree traversal unit configured to traverse a hierarchical tree data structure. In an embodiment, the SFU 1512 modules may include texture unit configured to perform texture map filtering operations. In an embodiment, the texture units are configured to load texture maps (e.g., a 2D array of texels) from the memory 1204 and sample the texture maps to produce sampled texture values for use in shader programs executed by the SM 1500. In an embodiment, the texture maps are stored in the shared memory/L1 cache 1518. The texture units implement texture operations such as filtering operations using mip-maps (e.g., texture maps of varying levels of detail). In an embodiment, each SM 1500 includes two texture units.

Each SM 1500 also comprises N LSU 1514 modules that implement load and store operations between the shared memory/L1 cache 1518 and the register file 1508. Each SM 1500 includes an interconnect network 1516 that connects each of the functional units to the register file 1508 and the LSU 1514 to the register file 1508 and shared memory/L1 cache 1518. In an embodiment, the interconnect network 1516 is a crossbar that can be configured to connect any of the functional units to any of the registers in the register file 1508 and connect the LSU 1514 modules to the register file 1508 and memory locations in shared memory/L1 cache 1518.

The shared memory/L1 cache 1518 is an array of on-chip memory that allows for data storage and communication between the SM 1500 and the primitive engine 1312 and between threads in the SM 1500. In an embodiment, the shared memory/L1 cache 1518 comprises 128 KB of storage capacity and is in the path from the SM 1500 to the memory partition unit 1400. The shared memory/L1 cache 1518 can be used to cache reads and writes. One or more of the shared memory/L1 cache 1518, L2 cache 1404, and memory 1204 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 1518 enables the shared memory/L1 cache 1518 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 12, are bypassed, creating a much simpler programming model. In the general purpose parallel computation configuration, the work distribution unit 1214 assigns and distributes blocks of threads directly to the DPC 1306 modules. The threads in a block execute the same program, using a unique thread ID in the calculation to ensure each thread generates unique results, using the SM 1500 to execute the program and perform calculations, shared memory/L1 cache 1518 to communicate between threads, and the LSU 1514 to read and write global memory through the shared memory/L1 cache 1518 and the memory partition unit 1400. When configured for general purpose parallel computation, the SM 1500 can also write commands that the scheduler unit 1212 can use to launch new work on the DPC 1306 modules.

The parallel processing unit 1200 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the parallel processing unit 1200 is embodied on a single semiconductor substrate. In another embodiment, the parallel processing unit 1200 is included in a system-on-a-chip (SoC) along with one or more other devices such as additional parallel processing unit 1200 modules, the memory 1204, a reduced instruction set computer (RISC) CPU, a memory management unit (MMU), a digital-to-analog converter (DAC), and the like.

In an embodiment, the parallel processing unit 1200 may be included on a graphics card that includes one or more memory devices 304. The graphics card may be configured to interface with a PCIe slot on a motherboard of a desktop computer. In yet another embodiment, the parallel processing unit 1200 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 16:
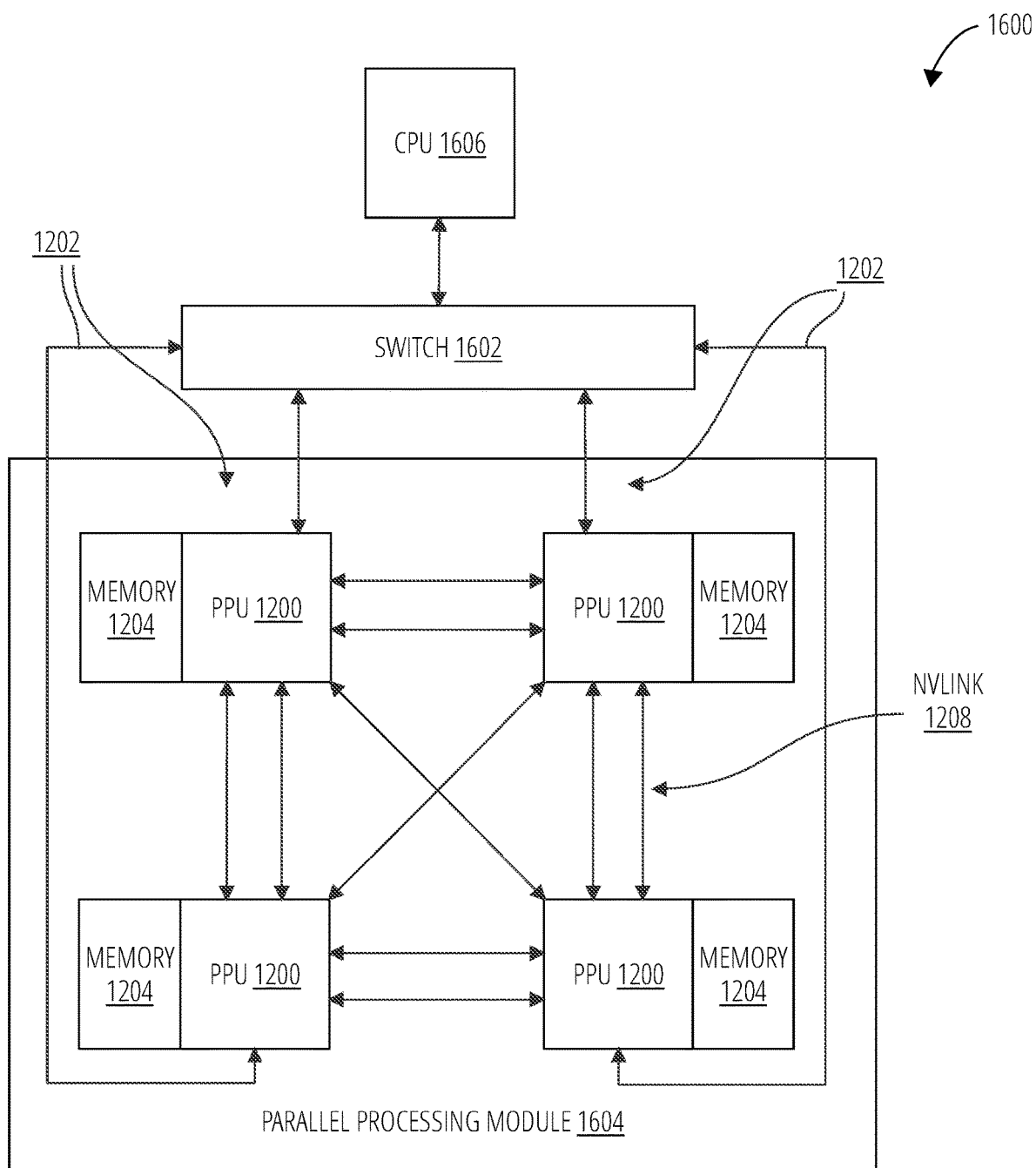
FIG. 16 illustrates a processing system 1600 in accordance with one embodiment.

FIG. 16 is a conceptual diagram of a processing system 1600 implemented using the parallel processing unit 1200 of FIG. 12, in accordance with an embodiment. The processing system 1600 includes a CPU 1606, switch 1602, and multiple parallel processing unit 1200 modules each and respective memory 1204 modules. The NVLink 1208 provides high-speed communication links between each of the parallel processing unit 1200 modules. Although a particular number of NVLink 1208 and interconnect 1202 connections are illustrated in FIG. 16, the number of connections to each parallel processing unit 1200 and the CPU 1606 may vary. The switch 1602 interfaces between the interconnect 1202 and the CPU 1606. The parallel processing unit 1200 modules, memory 1204 modules, and NVLink 1208 connections may be situated on a single semiconductor platform to form a parallel processing module 1604. In an embodiment, the switch 1602 supports two or more protocols to interface between various different connections and/or links.

In another embodiment (not shown), the NVLink 1208 provides one or more high-speed communication links between each of the parallel processing unit 1200 modules and the CPU 1606 and the switch 1602 interfaces between the interconnect 1202 and each of the parallel processing unit 1200 modules. The parallel processing unit 1200 modules, memory 1204 modules, and interconnect 1202 may be situated on a single semiconductor platform to form a parallel processing module 1604. In yet another embodiment (not shown), the interconnect 1202 provides one or more communication links between each of the parallel processing unit 1200 modules and the CPU 1606 and the switch 1602 interfaces between each of the parallel processing unit 1200 modules using the NVLink 1208 to provide one or more high-speed communication links between the parallel processing unit 1200 modules. In another embodiment (not shown), the NVLink 1208 provides one or more high-speed communication links between the parallel processing unit 1200 modules and the CPU 1606 through the switch 1602. In yet another embodiment (not shown), the interconnect 1202 provides one or more communication links between each of the parallel processing unit 1200 modules directly. One or more of the NVLink 1208 high-speed communication links may be implemented as a physical NVLink interconnect or either an on-chip or on-die interconnect using the same protocol as the NVLink 1208.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 1604 may be implemented as a circuit board substrate and each of the parallel processing unit 1200 modules and/or memory 1204 modules may be packaged devices. In an embodiment, the CPU 1606, switch 1602, and the parallel processing module 1604 are situated on a single semiconductor platform.

In an embodiment, the signaling rate of each NVLink 1208 is 20 to 25 Gigabits/second and each parallel processing unit 1200 includes six NVLink 1208 interfaces (as shown in FIG. 16, five NVLink 1208 interfaces are included for each parallel processing unit 1200). Each NVLink 1208 provides a data transfer rate of 25 Gigabytes/second in each direction, with six links providing 300 Gigabytes/second. The NVLink 1208 can be used exclusively for PPU-to-PPU communication as shown in FIG. 16, or some combination of PPU-to-PPU and PPU-to-CPU, when the CPU 1606 also includes one or more NVLink 1208 interfaces.

In an embodiment, the NVLink 1208 allows direct load/store/atomic access from the CPU 1606 to each parallel processing unit 1200 module's memory 1204. In an embodiment, the NVLink 1208 supports coherency operations, allowing data read from the memory 1204 modules to be stored in the cache hierarchy of the CPU 1606, reducing cache access latency for the CPU 1606. In an embodiment, the NVLink 1208 includes support for Address Translation Services (ATS), allowing the parallel processing unit 1200 to directly access page tables within the CPU 1606. One or more of the NVLink 1208 may also be configured to operate in a low-power mode.

Figure 17:
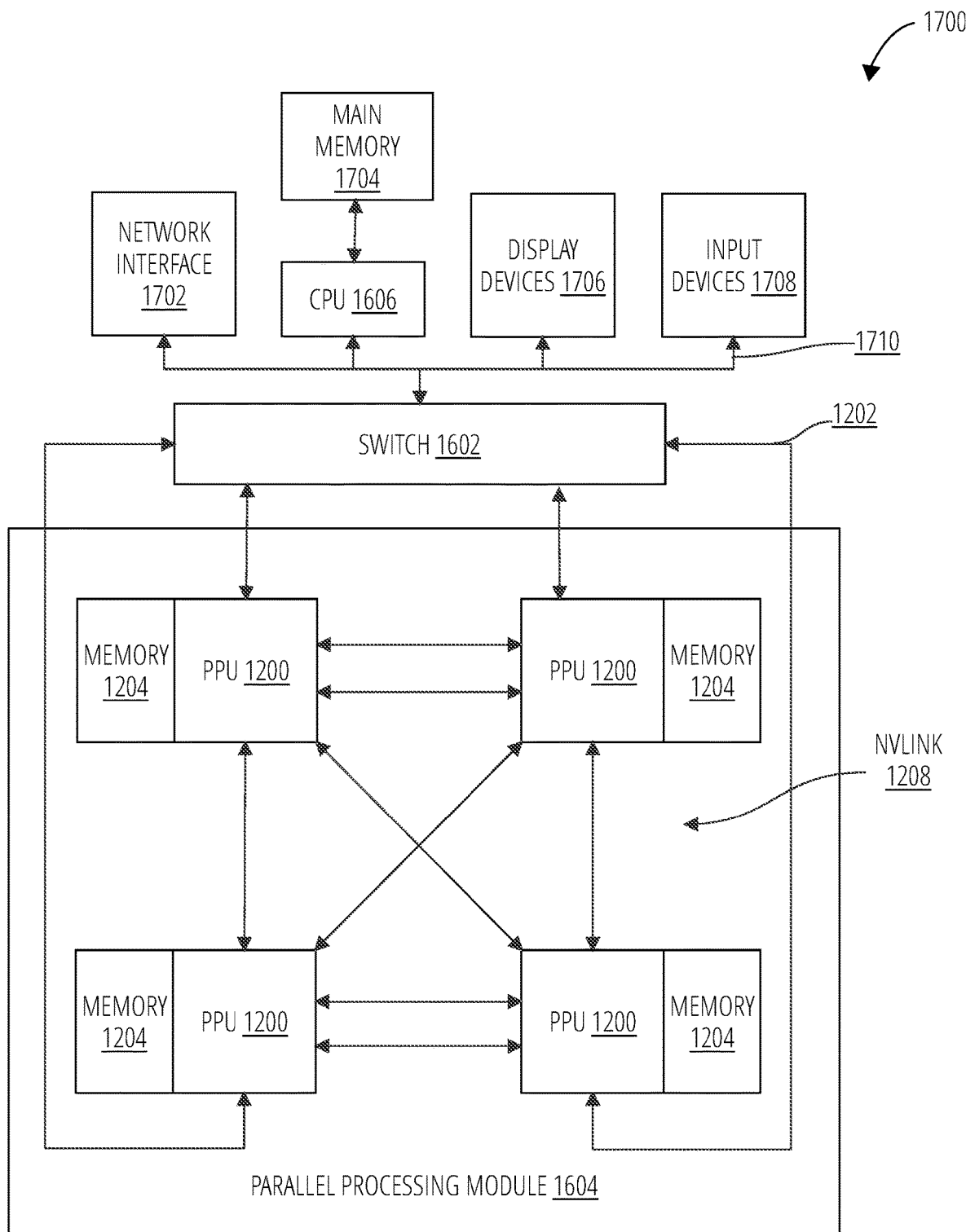
FIG. 17 illustrates an exemplary processing system 1700 in accordance with one embodiment.

FIG. 17 illustrates an exemplary processing system 1700 in which the various architecture and/or functionality of the various previous embodiments may be implemented. As shown, an exemplary processing system 1700 is provided including at least one CPU 1606 that is connected to a communication communications bus 1710. The communication communications bus 1710 may be implemented using any suitable protocol, such as PCI (Peripheral Component Interconnect), PCI-Express, AGP (Accelerated Graphics Port), HyperTransport, or any other bus or point-to-point communication protocol(s). The exemplary processing system 1700 also includes a main memory 1704. Control logic (software) and data are stored in the main memory 1704 which may take the form of random access memory (RAM).

The exemplary processing system 1700 also includes input devices 1708, the parallel processing module 1604, and display devices 1706, e.g. a conventional CRT (cathode ray tube), LCD (liquid crystal display), LED (light emitting diode), plasma display or the like. User input may be received from the input devices 1708, e.g., keyboard, mouse, touchpad, microphone, and the like. Each of the foregoing modules and/or devices may even be situated on a single semiconductor platform to form the exemplary processing system 1700. Alternately, the various modules may also be situated separately or in various combinations of semiconductor platforms per the desires of the user.

Further, the exemplary processing system 1700 may be coupled to a network (e.g., a telecommunications network, local area network (LAN), wireless network, wide area network (WAN) such as the Internet, peer-to-peer network, cable network, or the like) through a network interface 1702 for communication purposes.

The exemplary processing system 1700 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 1704 and/or the secondary storage. Such computer programs, when executed, enable the exemplary processing system 1700 to perform various functions. The main memory 1704, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the exemplary processing system 1700 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

FIG. 17 is a conceptual diagram of a graphics processing pipeline 1800 implemented by the parallel processing unit 1200 of FIG. 12, in accordance with an embodiment. In an embodiment, the parallel processing unit 1200 comprises a graphics processing unit (GPU). The parallel processing unit 1200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The parallel processing unit 1200 can be configured to process the graphics primitives to generate a frame buffer (e.g., pixel data for each of the pixels of the display).

An application writes model data for a scene (e.g., a collection of vertices and attributes) to a memory such as a system memory or memory 1204. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SM 1500 modules of the parallel processing unit 1200 including one or more of a vertex shader, hull shader, domain shader, geometry shader, and a pixel shader. For example, one or more of the SM 1500 modules may be configured to execute a vertex shader program that processes a number of vertices defined by the model data. In an embodiment, the different SM 1500 modules may be configured to execute different shader programs concurrently. For example, a first subset of SM 1500 modules may be configured to execute a vertex shader program while a second subset of SM 1500 modules may be configured to execute a pixel shader program. The first subset of SM 1500 modules processes vertex data to produce processed vertex data and writes the processed vertex data to the L2 cache 1404 and/or the memory 1204. After the processed vertex data is rasterized (e.g., transformed from three-dimensional data into two-dimensional data in screen space) to produce fragment data, the second subset of SM 1500 modules executes a pixel shader to produce processed fragment data, which is then blended with other processed fragment data and written to the frame buffer in memory 1204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The graphics processing pipeline 1800 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 1800 receives input data 601 that is transmitted from one stage to the next stage of the graphics processing pipeline 1800 to generate output data 1804. In an embodiment, the graphics processing pipeline 1800 may represent a graphics processing pipeline defined by the OpenGL® API. As an option, the graphics processing pipeline 1800 may be implemented in the context of the functionality and architecture of the previous Figures and/or any subsequent Figure(s).

Figure 18:
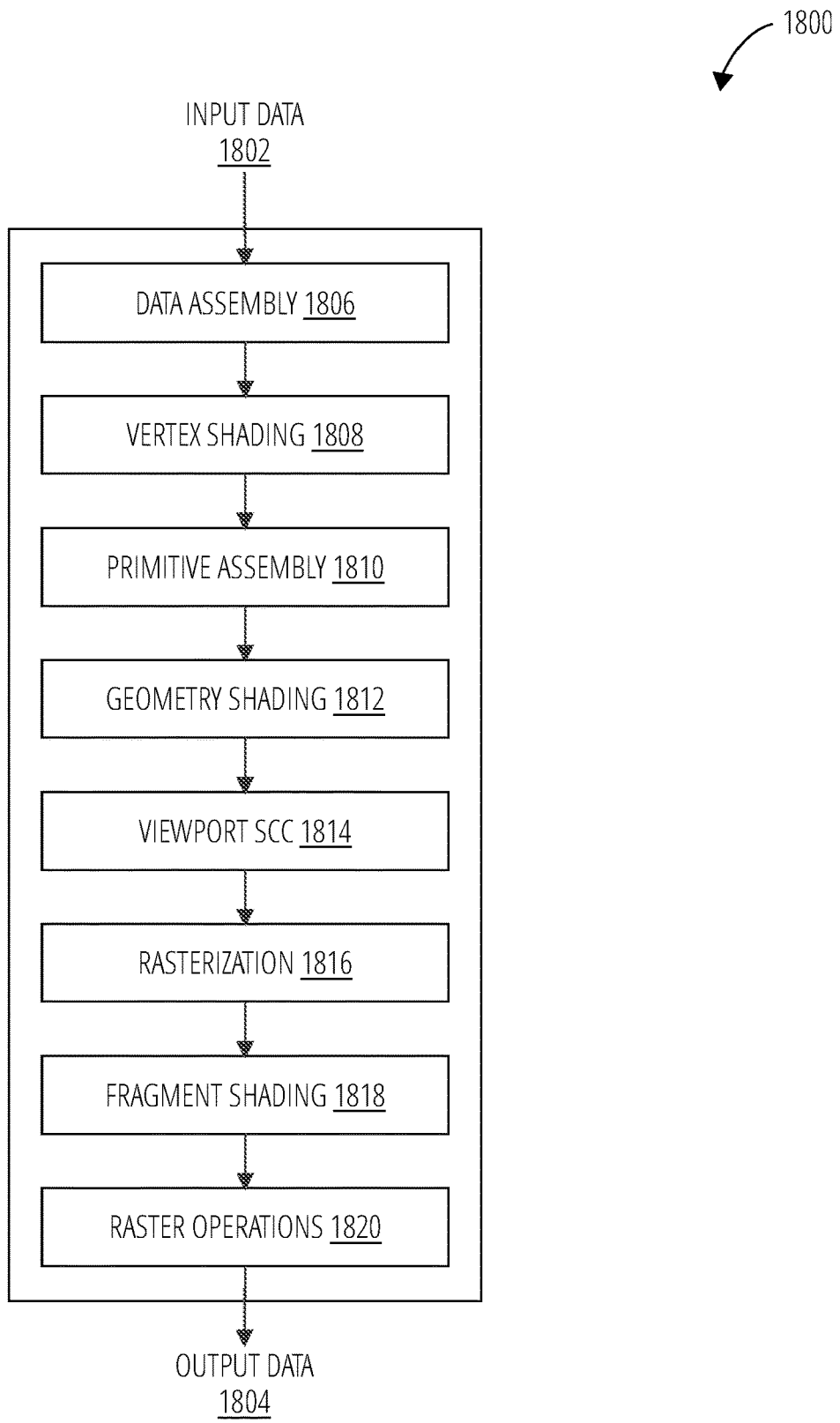
FIG. 18 illustrates a graphics processing pipeline 1800 in accordance with one embodiment.

As shown in FIG. 18, the graphics processing pipeline 1800 comprises a pipeline architecture that includes a number of stages. The stages include, but are not limited to, a data assembly 1806 stage, a vertex shading 1808 stage, a primitive assembly 1810 stage, a geometry shading 1812 stage, a viewport SCC 1814 stage, a rasterization 1816 stage, a fragment shading 1818 stage, and a raster operations 1820 stage. In an embodiment, the input data 1802 comprises commands that configure the processing units to implement the stages of the graphics processing pipeline 1800 and geometric primitives (e.g., points, lines, triangles, quads, triangle strips or fans, etc.) to be processed by the stages. The output data 1804 may comprise pixel data (e.g., color data) that is copied into a frame buffer or other type of surface data structure in a memory.

The data assembly 1806 stage receives the input data 1802 that specifies vertex data for high-order surfaces, primitives, or the like. The data assembly 1806 stage collects the vertex data in a temporary storage or queue, such as by receiving a command from the host processor that includes a pointer to a buffer in memory and reading the vertex data from the buffer. The vertex data is then transmitted to the vertex shading 1808 stage for processing.

The vertex shading 1808 stage processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading 1808 stage may manipulate individual vertex attributes such as position, color, texture coordinates, and the like. In other words, the vertex shading 1808 stage performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading 1808 stage generates transformed vertex data that is transmitted to the primitive assembly 1810 stage.

The primitive assembly 1810 stage collects vertices output by the vertex shading 1808 stage and groups the vertices into geometric primitives for processing by the geometry shading 1812 stage. For example, the primitive assembly 1810 stage may be configured to group every three consecutive vertices as a geometric primitive (e.g., a triangle) for transmission to the geometry shading 1812 stage. In some embodiments, specific vertices may be reused for consecutive geometric primitives (e.g., two consecutive triangles in a triangle strip may share two vertices). The primitive assembly 1810 stage transmits geometric primitives (e.g., a collection of associated vertices) to the geometry shading 1812 stage.

The geometry shading 1812 stage processes geometric primitives by performing a set of operations (e.g., a geometry shader or program) on the geometric primitives. Tessellation operations may generate one or more geometric primitives from each geometric primitive. In other words, the geometry shading 1812 stage may subdivide each geometric primitive into a finer mesh of two or more geometric primitives for processing by the rest of the graphics processing pipeline 1800. The geometry shading 1812 stage transmits geometric primitives to the viewport SCC 1814 stage.

In an embodiment, the graphics processing pipeline 1800 may operate within a streaming multiprocessor and the vertex shading 1808 stage, the primitive assembly 1810 stage, the geometry shading 1812 stage, the fragment shading 1818 stage, and/or hardware/software associated therewith, may sequentially perform processing operations. Once the sequential processing operations are complete, in an embodiment, the viewport SCC 1814 stage may utilize the data. In an embodiment, primitive data processed by one or more of the stages in the graphics processing pipeline 1800 may be written to a cache (e.g. L1 cache, a vertex cache, etc.). In this case, in an embodiment, the viewport SCC 1814 stage may access the data in the cache. In an embodiment, the viewport SCC 1814 stage and the rasterization 1816 stage are implemented as fixed function circuitry.

The viewport SCC 1814 stage performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization 1816 stage.

The rasterization 1816 stage converts the 3D geometric primitives into 2D fragments (e.g. capable of being utilized for display, etc.). The rasterization 1816 stage may be configured to utilize the vertices of the geometric primitives to setup a set of plane equations from which various attributes can be interpolated. The rasterization 1816 stage may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization 1816 stage generates fragment data (e.g., interpolated vertex attributes associated with a particular sample location for each covered pixel) that are transmitted to the fragment shading 1818 stage.

The fragment shading 1818 stage processes fragment data by performing a set of operations (e.g., a fragment shader or a program) on each of the fragments. The fragment shading 1818 stage may generate pixel data (e.g., color values) for the fragment such as by performing lighting operations or sampling texture maps using interpolated texture coordinates for the fragment. The fragment shading 1818 stage generates pixel data that is transmitted to the raster operations 1820 stage.

The raster operations 1820 stage may perform various operations on the pixel data such as performing alpha tests, stencil tests, and blending the pixel data with other pixel data corresponding to other fragments associated with the pixel. When the raster operations 1820 stage has finished processing the pixel data (e.g., the output data 1804), the pixel data may be written to a render target such as a frame buffer, a color buffer, or the like.

It will be appreciated that one or more additional stages may be included in the graphics processing pipeline 1800 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading 1812 stage). Other types of graphics processing pipelines are contemplated as being within the scope of the present disclosure. Furthermore, any of the stages of the graphics processing pipeline 1800 may be implemented by one or more dedicated hardware units within a graphics processor such as parallel processing unit 1200. Other stages of the graphics processing pipeline 1800 may be implemented by programmable hardware units such as the SM 1500 of the parallel processing unit 1200.

The graphics processing pipeline 1800 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the parallel processing unit 1200. The API provides an abstraction for a programmer that lets a programmer utilize specialized graphics hardware, such as the parallel processing unit 1200, to generate the graphical data without requiring the programmer to utilize the specific instruction set for the parallel processing unit 1200. The application may include an API call that is routed to the device driver for the parallel processing unit 1200. The device driver interprets the API call and performs various operations to respond to the API call. In some instances, the device driver may perform operations by executing instructions on the CPU. In other instances, the device driver may perform operations, at least in part, by launching operations on the parallel processing unit 1200 utilizing an input/output interface between the CPU and the parallel processing unit 1200. In an embodiment, the device driver is configured to implement the graphics processing pipeline 1800 utilizing the hardware of the parallel processing unit 1200.

Various programs may be executed within the parallel processing unit 1200 in order to implement the various stages of the graphics processing pipeline 1800. For example, the device driver may launch a kernel on the parallel processing unit 1200 to perform the vertex shading 1808 stage on one SM 1500 (or multiple SM 1500 modules). The device driver (or the initial kernel executed by the parallel processing unit 1200) may also launch other kernels on the parallel processing unit 1200 to perform other stages of the graphics processing pipeline 1800, such as the geometry shading 1812 stage and the fragment shading 1818 stage. In addition, some of the stages of the graphics processing pipeline 1800 may be implemented on fixed unit hardware such as a rasterizer or a data assembler implemented within the parallel processing unit 1200. It will be appreciated that results from one kernel may be processed by one or more intervening fixed function hardware units before being processed by a subsequent kernel on an SM 1500.

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

"Logic" is used herein to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

What is claimed is:

1. A receiver for sending and receiving data traffic on a network, the receiver comprising:
   a reorder buffer sized to absorb a first amount of the data traffic that may occur during a skew of the network;
   a replay buffer sized to absorb a second amount of the data traffic that may occur during a round trip time of the network;
   logic to access the reorder buffer and the replay buffer utilizing constant-access-time hash-based indexing by transforming a combination of packet fields into a hash value comprising an index into a first hash table; and
   the first hash table configured with an entry corresponding to a packet in at least the reorder buffer; and
   logic to free an entry for the packet in the first hash table when a corresponding request is removed from the reorder buffer on condition that the packet does not require exactly once delivery (EOD).

2. The receiver of claim 1, the logic to access the reorder buffer and the replay buffer comprising:
   logic to transform a combination of source device identifier (SID), connection identifier (CID), and sequence number (SEQ) into the hash value comprising the index into the first hash table; and
   the first hash table configured to store a first pointer for a packet in the reorder buffer.

3. The receiver of claim 2, each entry in the first hash table being N-way set-associative, where N>1.

4. The receiver of claim 2, the first hash table further configured to store a second pointer for the packet in the replay buffer.

5. The receiver of claim 2, further comprising a second hash table configured to store a second pointer for the packet in the replay buffer.

6. The receiver of claim 2, further comprising a spillover buffer.

7. The receiver of claim 6, the hash value comprising an index for the packet in the first hash table.

8. The receiver of claim 6, the spillover buffer configured to store a first pointer for the packet in the reorder buffer and a second pointer for the packet in the replay buffer.

9. The receiver of claim 1, further comprising logic to free the entry in the first hash table once a corresponding acknowledgement is removed from the replay buffer, on condition that the packet requires EOD.

10. A method for sending and receiving data traffic on a network, the method comprising:
   sizing a reorder to absorb a first amount of the data traffic that may occur based on a maximum skew of the network;
   sizing a replay buffer to absorb a second amount of the data traffic that may occur during a maximum round trip time of the network;
   accessing the reorder buffer and the replay buffer utilizing constant-access-time hash-based indexing by transforming a combination of packet fields into a hash value comprising an index into a first hash table;
   transforming a combination of source device identifier (SID), connection identifier (CID), and sequence number (SEQ) of a packet into the hash value comprising an index into the first hash table; and
   configuring the first hash table to store a first pointer for the packet in the reorder buffer.

11. The method of claim 10, each entry in the first hash table being N-way set-associative, where N>1.

12. The method of claim 10, further comprising:
   configuring the first hash table further to store a second pointer for the packet in the replay buffer.

13. The method of claim 10, further comprising:
   configuring a second hash table to store a second pointer for the packet in the replay buffer.

14. The method of claim 10, further comprising providing a spillover buffer.

15. The method of claim 14, the hash value comprising an index for the packet in the first hash table.

16. The method of claim 14, further comprising:
   configuring the spillover buffer to store a first pointer for the packet in the reorder buffer and a second pointer for the packet in the replay buffer.

17. The method of claim 10, further comprising:
   configuring the first hash table with an entry corresponding to a packet in at least the reorder buffer; and
   freeing an entry for the packet in the first hash table when a corresponding request is removed from the reorder buffer on condition that the packet does not require exactly once delivery (EOD).

18. The method of claim 17, further comprising:
   freeing the entry in the first hash table once a corresponding acknowledgement is removed from the replay buffer, on condition that the packet requires EOD.

19. A communication method between a source device and a target device, the method comprising:
   performing fine-grained packet ordering at a receiver for the target device to remove packet dependencies;
   wherein the fine-grained packet ordering is carried out using a reorder buffer sized to absorb an amount of data traffic that may occur during a skew of the network, and the reorder buffer controls a replay buffer sized to absorb an amount of the data traffic that may occur during a round trip time of the network;
   the reorder buffer and the replay buffer utilizing constant-access-time hash-based indexing by transforming a combination of packet fields into a hash value comprising an index into a hash table;
   configuring the first hash table with an entry corresponding to a packet in at least the reorder buffer; and
   freeing an entry for the packet in the first hash table when a corresponding request is removed from the reorder buffer on condition that the packet does not require exactly once delivery (EOD).

* * * * *